US009674322B2

(12) United States Patent
Motohashi et al.

(10) Patent No.: US 9,674,322 B2
(45) Date of Patent: Jun. 6, 2017

(54) ELECTRONIC APPARATUS

(71) Applicant: KYOCERA Corporation, Kyoto-shi, Kyoto (JP)

(72) Inventors: Koji Motohashi, Omihachiman (JP); Toshimitsu Matsuura, Osaka (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 15/253,125

(22) Filed: Aug. 31, 2016

(65) Prior Publication Data
US 2016/0373564 A1 Dec. 22, 2016

Related U.S. Application Data

(63) Continuation of application No. PCT/JP2014/005978, filed on Nov. 28, 2014.

(30) Foreign Application Priority Data

May 28, 2014 (JP) ................................. 2014-110385

(51) Int. Cl.
H04M 1/00 (2006.01)
H04M 1/02 (2006.01)
G06F 1/16 (2006.01)
H04M 1/18 (2006.01)

(52) U.S. Cl.
CPC ............ H04M 1/0266 (2013.01); G06F 1/16 (2013.01); H04M 1/026 (2013.01); H04M 1/185 (2013.01)

(58) Field of Classification Search
USPC ........ 455/575.1, 550.1, 575.8; 361/776, 789, 361/679.1
See application file for complete search history.

(56) References Cited

U.S. PATENT DOCUMENTS

2004/0157652 A1   8/2004   Yamazaki
2005/0285991 A1  12/2005   Yamazaki
2014/0177151 A1*  6/2014   Manda ................ H04M 1/0252
                                              361/679.3
(Continued)

FOREIGN PATENT DOCUMENTS

JP      09-008690 A      1/1997
JP      2004-180223 A    6/2004
(Continued)

OTHER PUBLICATIONS

International Search Report and Written Opinion of the International Searching Authority issued by the Japanese Patent Office for International Application No. PCT/JP2014/005978.
(Continued)

Primary Examiner — Ganiyu A Hanidu
(74) Attorney, Agent, or Firm — Procopio Cory Hargreaves and Savitch LLP

(57) ABSTRACT

An electronic apparatus includes a panel, a display, and a housing. The panel has a first main surface, a second main surface opposite to the first main surface, and side surfaces that connect the first main surface and the second main surface. The display is located on the second main surface side of the panel. The housing configured to house the display and holds the panel. At least one of the side surfaces of the panel includes a first portion that does not face the housing.

16 Claims, 20 Drawing Sheets

(56) References Cited

U.S. PATENT DOCUMENTS

| | | | | |
|---|---|---|---|---|
| 2015/0023530 A1* | 1/2015 | Takahashi | ............... | H04R 17/00 381/190 |
| 2015/0086030 A1* | 3/2015 | Moriai | ................ | H04M 19/047 381/59 |
| 2015/0104047 A1* | 4/2015 | Izumi | ...................... | H04M 1/03 381/162 |

FOREIGN PATENT DOCUMENTS

| | | |
|---|---|---|
| JP | 2006-011163 A | 12/2005 |
| WO | 2013/011616 A1 | 1/2013 |
| WO | 2013/145354 A1 | 10/2013 |

OTHER PUBLICATIONS

Office Action dated Feb. 19, 2014, issued in counterpart Japanese application No. 2014-110385.

\* cited by examiner

F I G. 3
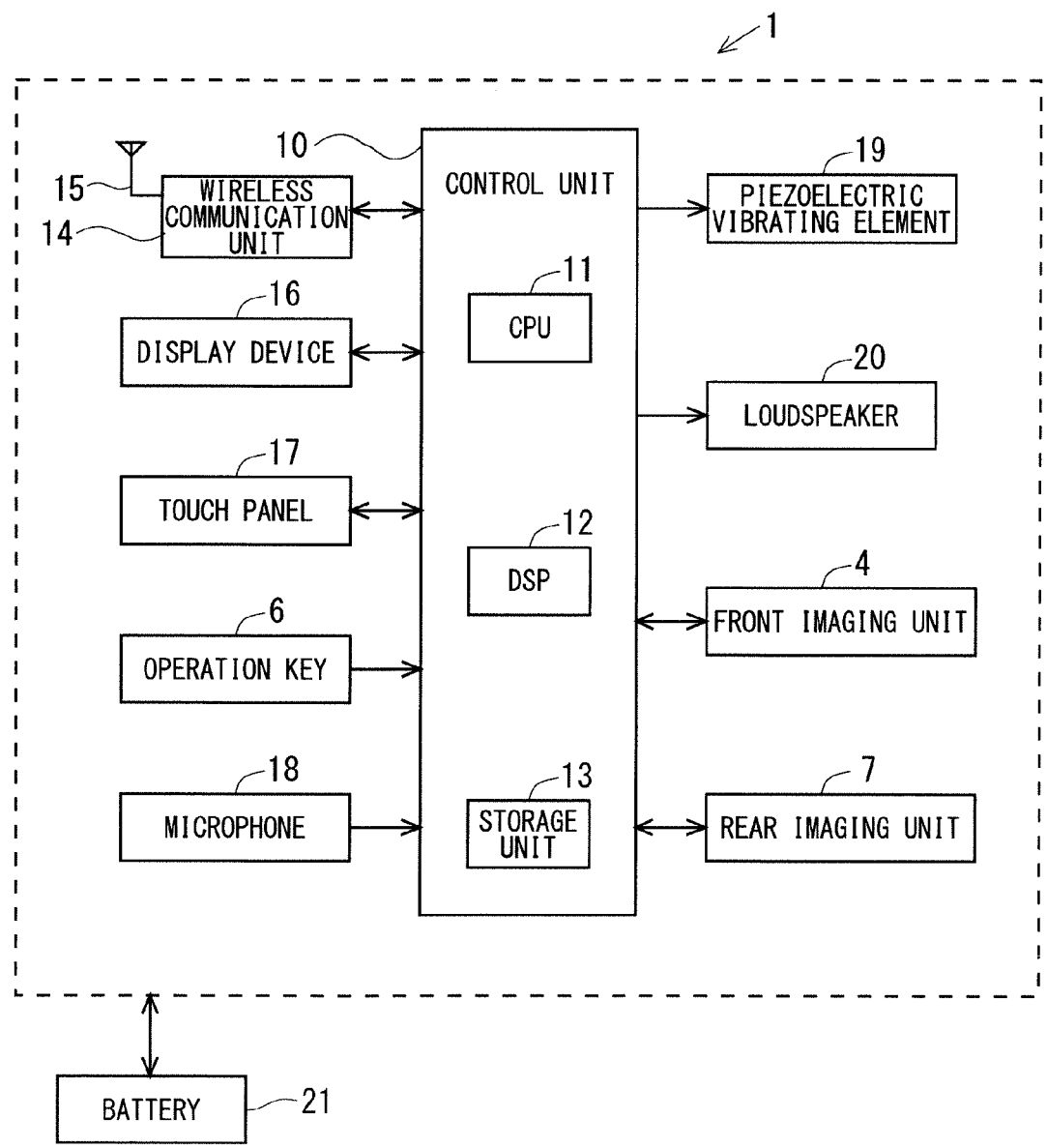

F I G . 8
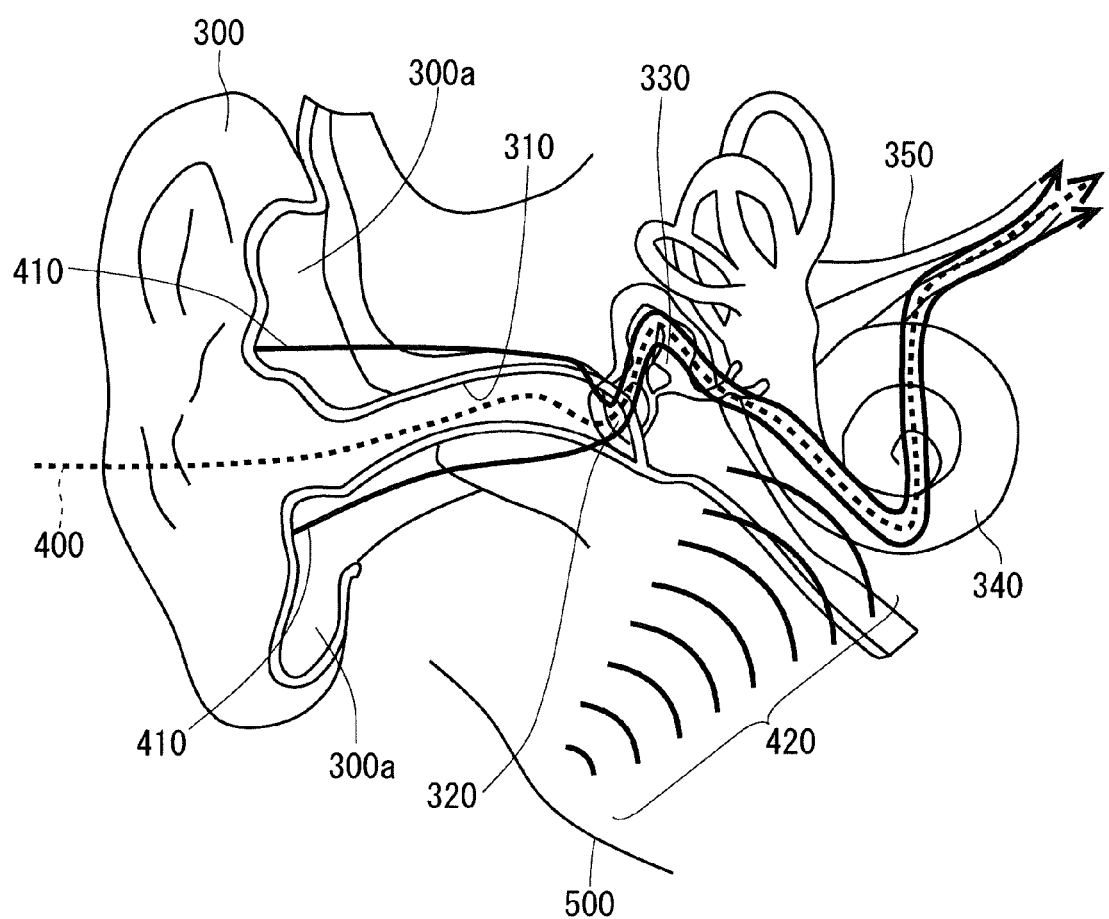

F I G. 1 1
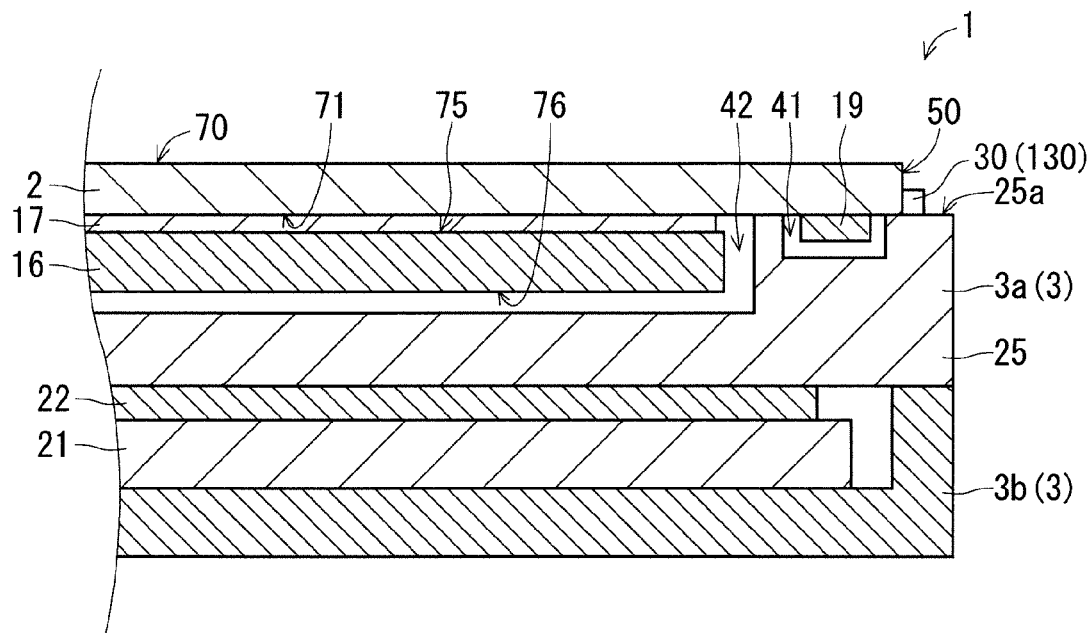
F I G. 1 2
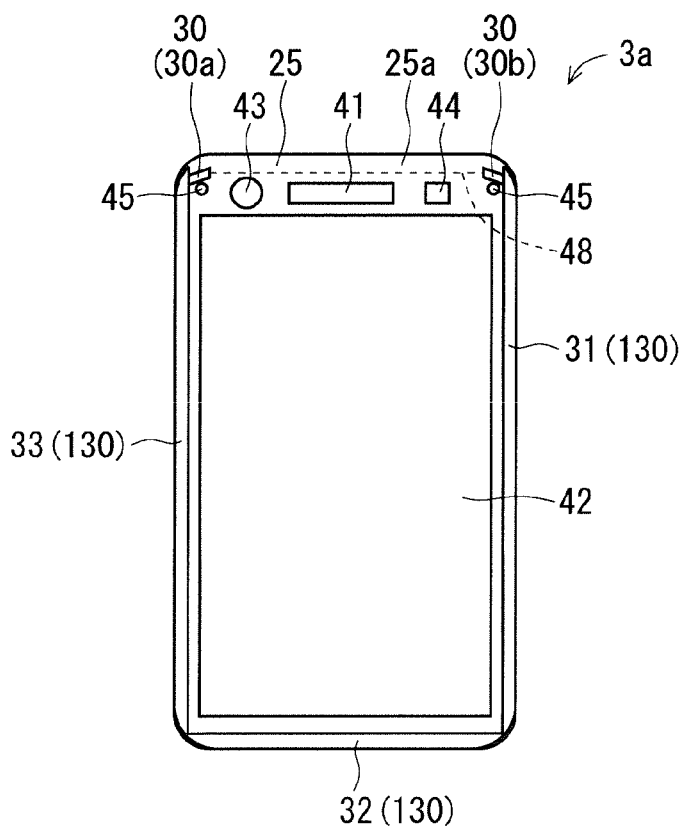

F I G. 2 8
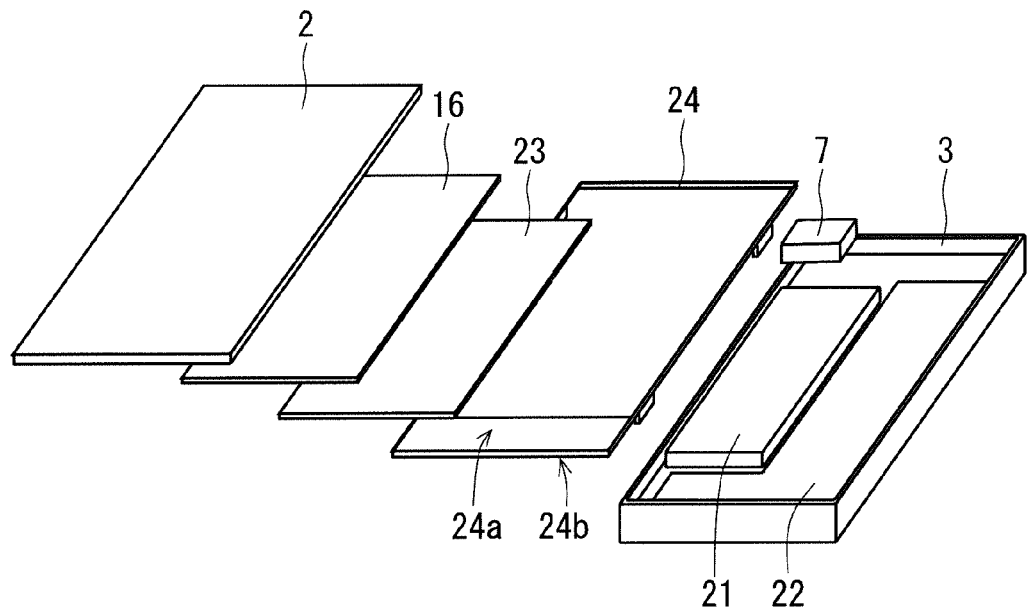
F I G. 2 9
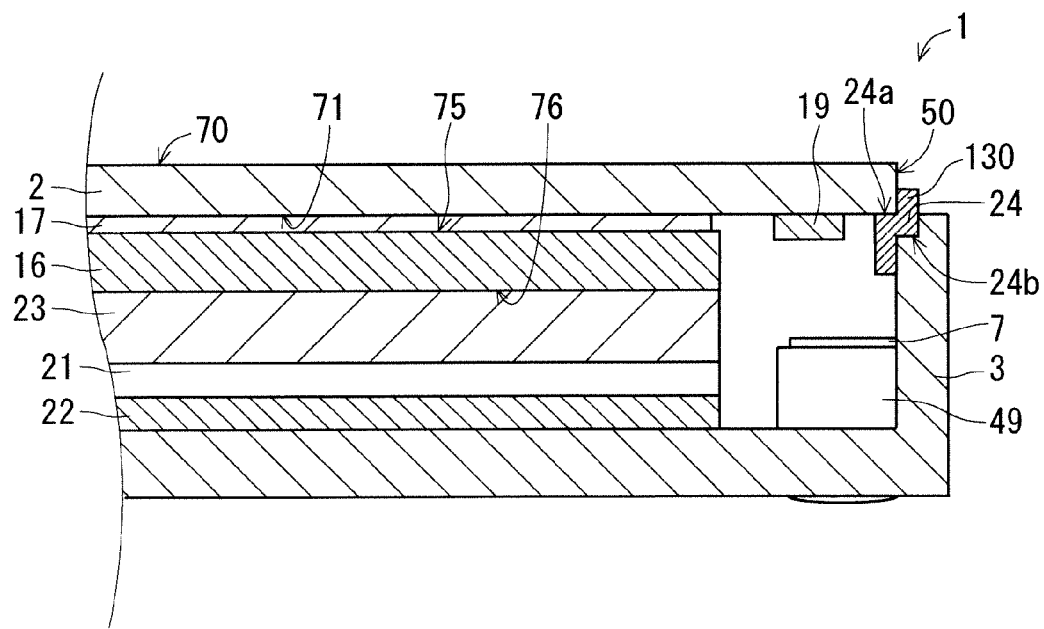

F I G . 3 5
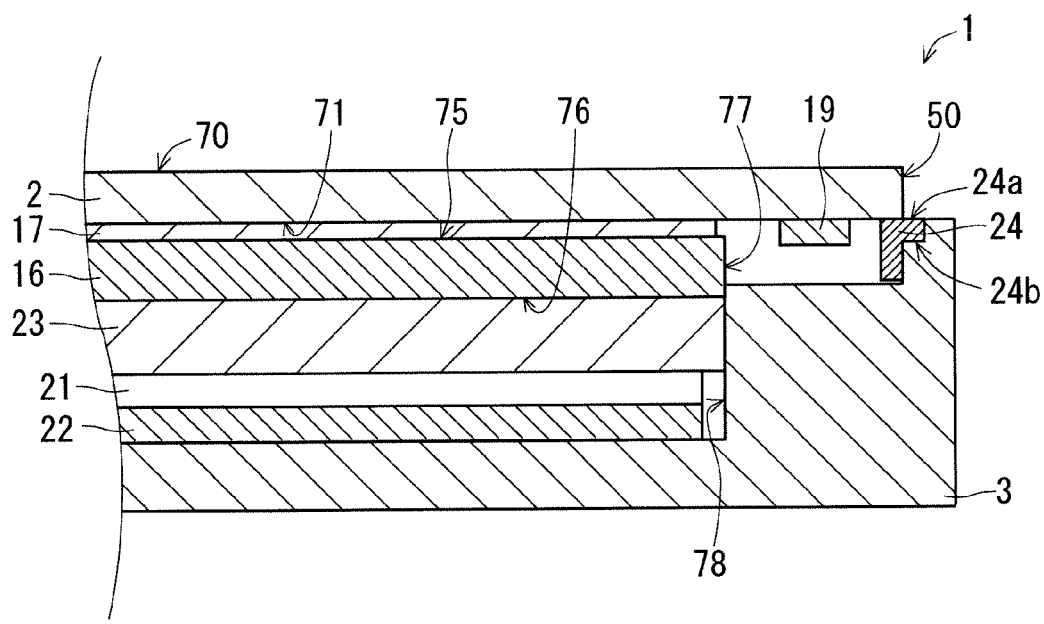
F I G . 3 6
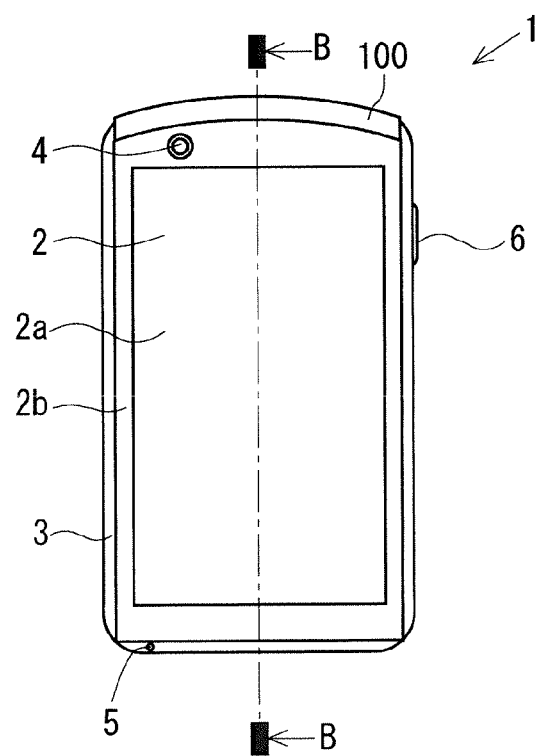

ELECTRONIC APPARATUS

CROSS-REFERENCE TO RELATED APPLICATION

The present application is a continuation based on PCT Application No. PCT/JP2014/005978 filed on Nov. 28, 2014, which claims the benefit of Japanese Application No. 2014-110385, filed on May 28, 2014. PCT Application No. PCT/JP2014/005978 is entitled "ELECTRONIC APPARATUS", and Japanese Application No. 2014-110385 is entitled "ELECTRONIC APPARATUS". The contents of which are incorporated by reference herein in their entirety.

FIELD

Embodiments of the present disclosure relate to an electronic apparatus.

BACKGROUND

Various techniques have been traditionally proposed for electronic apparatuses.

SUMMARY

An electronic apparatus is disclosed. In one embodiment, an electronic apparatus comprises a panel, a display, and a housing. The panel includes a first main surface, a second main surface opposite to the first main surface, and side surfaces that connect the first main surface and the second main surface. The display is located on the second main surface side of the panel. The housing is configured to house the display and hold the panel. At least one of the side surfaces of the panel includes a first portion that does not face the housing.

BRIEF DESCRIPTION OF DRAWINGS

FIG. 3 illustrates a block diagram of an electrical configuration of the electronic apparatus.

FIG. 8 illustrates a view for describing the air conduction sound and the conduction sound.

FIG. 11 illustrates a cross-section of an electronic apparatus according to a first embodiment.

FIG. 12 illustrates a front housing according to the first embodiment.

FIG. 28 illustrates an exploded perspective view of an electronic apparatus according to a fourth embodiment.

FIG. 29 illustrates a cross-section of the electronic apparatus according to the fourth embodiment.

FIG. 35 illustrates a cross-section of the electronic apparatus according to the fourth embodiment.

FIG. 36 illustrates a front housing according to a modification.

DETAILED DESCRIPTION

<<Electronic Apparatus>>

First, a description will be given of a configuration of an electronic apparatus 1 common to first to fourth embodiments described below.

<External Appearance of Electronic Apparatus>

Figure 1:
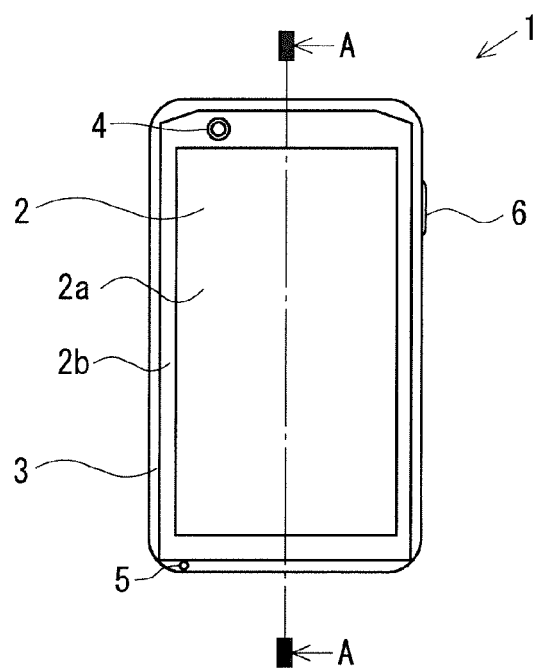
FIG. 1 illustrates a front view of an external appearance of an electronic apparatus.
Figure 2:
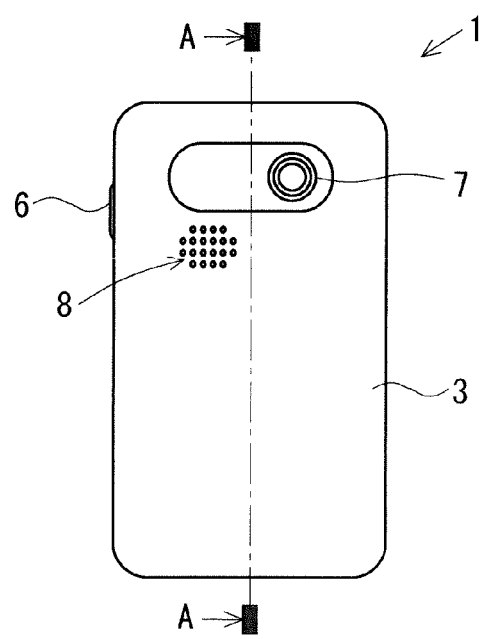
FIG. 2 illustrates a rear view of the external appearance of the electronic apparatus.

FIGS. 1 and 2 are a front view and a rear view, respectively, illustrating an example of the external appearance of the electronic apparatus 1. The electronic apparatus 1 according to an example embodiment is, for example, a mobile phone such as a smartphone, and can communicate with other communication apparatus via a base station, a server, and the like. As illustrated in FIGS. 1 and 2, the electronic apparatus 1 has a plate shape substantially rectangular in a plan view. As illustrated in FIGS. 1 and 2, the exterior surface (surface) of the electronic apparatus 1 is formed of a cover panel 2 and a housing 3.

The cover panel 2 has a plate shape in a plan view. As illustrated in FIG. 1, the cover panel 2 is arranged on a portion other than a peripheral portion of the front portion of the electronic apparatus 1. The cover panel 2 has a first main surface 70 forming a portion of the front surface of the electronic apparatus 1 and a second main surface 71 located opposite to the first main surface 70 (see FIG. 9 described below). Hereinafter, the first main surface 70 may be referred to as an "outer main surface 70" and the second main surface 71 may be referred to as an "inner main surface 71." The shape of the cover panel 2 will be described below in detail.

The cover panel 2 is made of a hard transparent material. The cover panel 2 may be, for example, sapphire. Sapphire is harder than glass components such as quartz densely located on the earth's surface. In the case where, for example, the material for the cover panel 2 is sapphire, accordingly, the cover panel 2 is resistant to damage even if the electronic apparatus 1 is dropped outdoors. Here, sapphire refers to a single crystal containing alumina (Al2O3) as a main component, which is a single crystal whose purity of Al2O3 is approximately greater than or equal to 90% in the present specification. The purity of Al2O3 is preferably greater than or equal to 99% which provides a resistance to damage of the cover panel and a reduction of cracks or chipping. The "panel made of sapphire" to be used as the cover panel 2 includes a panel made of sapphire single components as well as a composite panel produced by bonding a panel made of sapphire single components and a glass panel to each other. It suffices that in the composite panel, the panel made of sapphire single components is disposed on the exposed surface of the electronic apparatus 1. Thus, in the case where the panel made of sapphire is a composite panel and a glass panel is used on the inner main surface 71 side of the composite panel, parts mounted on the inner main surface 71 of the cover panel 2, such as a piezoelectric vibrating element 19 and a touch panel 17, may be mounted on the glass panel.

In an example embodiment, the cover panel 2 is a panel of a one-layer structure having a layer made of sapphire which is disposed on the surface of the electronic apparatus 1. Alternatively, the cover panel may be a composite panel (laminated panel) of a multilayer structure having such a layer. For example, the cover panel 2 may be a composite panel of a two-layered structure configured of a layer (sapphire panel) made of sapphire which is disposed on the surface of the electronic apparatus 1 and a layer (glass panel) made of glass which is attached to the layer. In addition, the cover panel 2 may be a composite panel of a three-layered structure configured of a layer (sapphire panel) made of sapphire which is disposed on the surface of the electronic apparatus 1, a layer (glass panel) made of glass which is attached to the layer made of sapphire, and a layer (sapphire panel) made of sapphire which is attached to the layer made of glass. Further, the cover panel 2 may include a layer made of crystalline materials other than sapphire such as diamond, zirconia, titania, crystal, lithium tantalite, and aluminum oxynitride.

The cover panel 2 may be made of other materials such as diamond, zirconia, titania, crystal, lithium tantalite, and aluminum oxynitride. Many crystalline materials such as sapphire and diamond are hard but are resistant to deformation. If the cover panel 2 deforms, accordingly, the cover panel 2 may crack. Therefore, first to fourth embodiments will describe the configuration of the electronic apparatus 1 including the cover panel 2 resistant to cracking.

The cover panel 2 includes a display portion 2a and a peripheral portion 2b. Various pieces of information such as characters, symbols, figures, and images displayed by a display device 16 described below are visually recognized by the user through the display portion 2a of the cover panel 2. The peripheral portion 2b surrounding the display portion 2a in the cover panel 2 is opaque and/or not transparent because of, for example, a film or the like that is attached thereto. In the peripheral portion 2b, the display by the display device 16 is difficult to be visually recognized by the user.

Provided at an upper end of the cover panel 2 is a front imaging unit 4. The touch panel 17 described below is attached to the inner main surface 71 of the cover panel 2. The user can provide various instructions to the electronic apparatus 1 by operating the display portion 2a of the cover panel 2 using a finger or the like.

The housing 3 of the electronic apparatus 1 includes a peripheral portion of a front surface, a side surface, and the rear surface. The housing 3 is formed of, for example, a resin. The resin forming the housing 3 may be, for example, a polycarbonate resin, an acrylonitrile butadiene styrene (ABS) resin, or a nylon-based resin. The housing 3 may be configured of only one material or a combination of materials.

The portion of the housing 3, which forms the peripheral portion of the front surface of the electronic apparatus 1, has a microphone hole 5. The electronic apparatus 1 is provided with an operation button 6 on its side surface. The operation button 6 is pressed when, for example, the user activates the electronic apparatus 1. As illustrated in FIG. 2, the electronic apparatus 1 includes a rear imaging unit 7 and has loudspeaker holes 8 on its rear surface.

The operation button 6 may be, for example, glass or resin. Other materials that may be used for the operation button 6 include crystalline materials such as sapphire, diamond, zirconia, titania, crystal, lithium tantalite, and aluminum oxynitride.

<Electrical Configuration of Electronic Apparatus>

FIG. 3 is a block diagram illustrating an electrical configuration of the electronic apparatus 1. As illustrated in FIG. 3, the electronic apparatus 1 includes a control unit 10, a wireless communication unit 14, the display device 16, the touch panel 17, the operation button 6, a microphone 18, the piezoelectric vibrating element 19, a loudspeaker 20, the front imaging unit 4, the rear imaging unit 7, and a battery 21. These elements are accommodated in the housing 3.

The control unit 10 includes a Central Processing Unit (CPU) 11, a Digital Signal Processor (DSP) 12, and a storage unit 13. The control unit 10 manages the overall operation of the electronic apparatus 1 by controlling other elements of the electronic apparatus 1. The storage unit 13 includes, for example, a Read Only Memory (ROM) and a Random Access Memory (RAM). The storage unit 13 stores a main program, a plurality of application programs, and the like, which are control programs for controlling the electronic apparatus 1, specifically, the elements included in the electronic apparatus 1, such as the wireless communication unit 14 and the display device 16. Various functions of the control unit 10 can be realized by the CPU 11 and the DSP 12 executing various programs in the storage unit 13.

The wireless communication unit 14 includes an antenna 15. In the wireless communication unit 14, the antenna 15 receives a signal from a mobile phone different from the electronic apparatus 1, or from a communication device such as a web server connected to the Internet via a base station.

The display device 16 is, for example, a liquid crystal display or an organic electro luminescent (EL) display. As described above, the various pieces of information displayed by the display device 16 are visually recognized from the outside of the electronic apparatus 1 through the display portion 2a.

The touch panel 17 is, for example, a projection type electrostatic capacitance touch panel. The touch panel 17 is bonded to the inner main surface 71 of the cover panel 2. The touch panel 17 includes two sheet-shaped electrode sensors disposed in such a manner that they face each other. When the user comes into contact with the display portion 2a using an operating element such as a finger, the capacitance in the portion of the touch panel 17, which faces the operating element, changes. Then, the touch panel 17 outputs an electrical signal according to the capacitance change to the control unit 10. In this manner, the touch panel 17 can detect contact of the operating element with respect to the display portion 2a.

When being pressed, the operation button 6 outputs an electrical instruction signal to the control unit 10. The microphone 18 receives voice or the like of the user during, for example, communication, converts the received voice or the like into an electrical signal, and then outputs the electrical signal to the control unit 10.

The piezoelectric vibrating element 19 is bonded to the inner main surface 71 of the cover panel 2. The piezoelectric vibrating element 19 is vibrated upon application of a drive voltage provided from the control unit 10. The control unit 10 generates a drive voltage based on a sound signal, and then provides the drive voltage to the piezoelectric vibrating element 19. When the piezoelectric vibrating element 19 is vibrated based on the sound signal by the control unit 10, the cover panel 2 vibrates based on the sound signal. Accordingly, the reception sound is transmitted from the cover panel 2 to the user. The volume of the reception sound is set to a degree such that the user can hear the sound when moving the cover panel 2 close to an ear. The piezoelectric vibrating element 19 and the reception sound transmitted from the cover panel 2 to the user will be described below in detail.

Although the case in which the reception sound is transmitted from the cover panel 2 to the user by the piezoelectric vibrating element 19 will be described below, for example, such a dynamic speaker may be used that converts an electrical sound signal from the control unit 10 into a sound and then outputs the sound, in place of the piezoelectric vibrating element 19. In the case where the dynamic speaker is used, receiver holes are provided in the cover panel 2 or the housing 3. The sound output from the dynamic speaker is output to the outside through the receiver holes provided in the cover panel 2 or the housing 3. The volume of the sound output through the receiver holes is lower than the volume of the sound output through the loudspeaker holes 8.

The loudspeaker 20 converts an electrical sound signal from the control unit 10 into a sound and then outputs the sound, thereby providing a ringer or the like to the user apart from the electronic apparatus 1. The front imaging unit 4 and the rear imaging unit 7 image still images and moving images. The battery 21 outputs the power for the electronic apparatus 1. The power output from the battery 21 is supplied to electronic parts included in the control unit 10, the wireless communication unit 14, and the like of the electronic apparatus 1.

<Details of Piezoelectric Vibrating Element>

Figure 4:
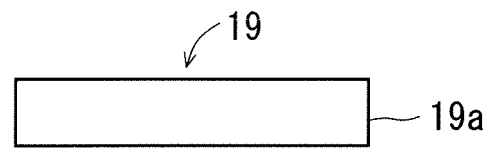
FIG. 4 illustrates a top view of a structure of a piezoelectric vibrating element.
Figure 5:
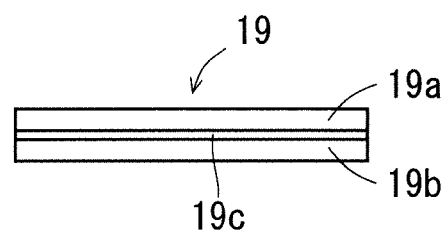
FIG. 5 illustrates a side view of the structure of the piezoelectric vibrating element.

FIGS. 4 and 5 illustrate a top view and a side view, respectively, of a structure of the piezoelectric vibrating element 19. As illustrated in FIGS. 4 and 5, the piezoelectric vibrating element 19 has a long shape in one direction. Specifically, the piezoelectric vibrating element 19 has a long and narrow rectangular plate shape in a plan view. The piezoelectric vibrating element 19 has, for example, a bimorph structure. The piezoelectric vibrating element 19 includes a first piezoelectric ceramic plate 19a and a second piezoelectric ceramic plate 19b which are bonded to each other through a shim material 19c. While the piezoelectric vibrating element including the first piezoelectric ceramic plate 19a and the second piezoelectric ceramic plate 19b is used in an example embodiment, the configuration of the piezoelectric vibrating element is not limited to such a specific example. For example, the piezoelectric vibrating element 19 may be a piezoelectric vibrating element having a piezoelectric plate made of an organic piezoelectric material such as polyvinylidene fluoride or polylactic acid.

In the piezoelectric vibrating element 19, when a positive voltage is applied to the first piezoelectric ceramic plate 19a and a negative voltage is applied to the second piezoelectric ceramic plate 19b, the first piezoelectric ceramic plate 19a extends along the longitudinal direction and the second piezoelectric ceramic plate 19b contracts along the longitudinal direction. Accordingly, as illustrated in FIG. 6, the piezoelectric vibrating element 19 is bent into a convex shape with the first piezoelectric ceramic plate 19a being outside.

In contrast, in the piezoelectric vibrating element 19, when a negative voltage is applied to the first piezoelectric ceramic plate 19a and a positive voltage is applied to the second piezoelectric ceramic plate 19b, the first piezoelectric ceramic plate 19a contracts along the longitudinal direction and the second piezoelectric ceramic plate 19b extends along the longitudinal direction. Accordingly, as illustrated in FIG. 7, the piezoelectric vibrating element 19 is bent into a convex shape with the second piezoelectric ceramic plate 19b being outside.

Figure 6:
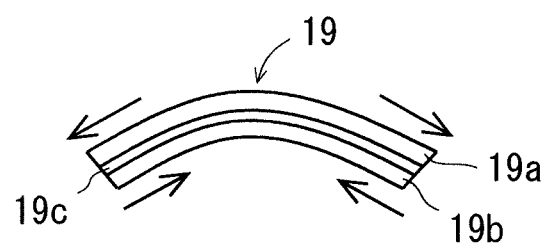
FIG. 6 illustrates a state where the piezoelectric vibration element vibrates while being bent.
Figure 7:
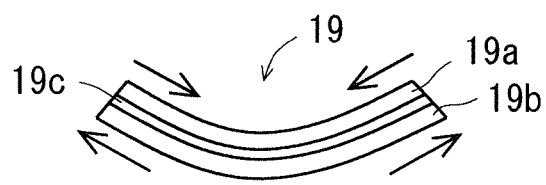
FIG. 7 illustrates a state where the piezoelectric vibration element vibrates while being bent.

The piezoelectric vibrating element 19 vibrates while being bent along the longitudinal direction by alternately taking the state of FIG. 6 and the state of FIG. 7. The control unit 10 allows the piezoelectric vibrating element 19 to vibrate while being bent along the longitudinal direction by applying an alternating current (AC) voltage in which the positive voltage and the negative voltage alternately appear at an area between the first piezoelectric ceramic plate 19a and the second piezoelectric ceramic plate 19b.

Only one structure made of the first piezoelectric ceramic plate 19a and the second piezoelectric ceramic plate 19b, which are bonded to each other with the shim material 19c therebetween, is provided in the piezoelectric vibrating element 19 illustrated in FIGS. 4 to 7. Alternatively, a plurality of the structures may be laminated to each other.

The piezoelectric vibrating element 19 having such a structure is disposed on the peripheral end of the inner main surface 71 of the cover panel 2. Specifically, the piezoelectric vibrating element 19 is disposed in a central portion in a short-length direction in the upper end of the inner main surface 71 of the cover panel 2. The piezoelectric vibrating element 19 is disposed such that the longitudinal direction thereof extends along the short-length direction of the cover panel 2. In this manner, the piezoelectric vibrating element 190 vibrates while being bent along the short-length direction of the cover panel 2. Further, the center of the piezoelectric vibrating element 19 in the longitudinal direction corresponds to the center in the short-length direction in the upper end of the inner main surface 71 of the cover panel 2.

As illustrated in FIG. 6 and FIG. 7, the center of the piezoelectric vibrating element 19 in the longitudinal direction has the largest displacement amount when the piezoelectric vibrating element 19 is vibrating. Accordingly, an area in the center in the short-length direction in the upper end of the inner main surface 71 of the cover panel 2, which corresponds to the position of the piezoelectric vibrating element 19, has the largest displacement amount of bending and vibrating.

<Generation of Reception Sound>

In the electronic apparatus 1 according to an example embodiment, the piezoelectric vibrating element 19 causes the cover panel 2 to vibrate, so that the air conduction sound and the conduction sound are transmitted from the cover panel 2 to the user. In other words, a vibration of the piezoelectric vibrating element 19 itself is transmitted to the cover panel 2, so that the air conduction sound and the conduction sound are transmitted from the cover panel 2 to the user.

Here, the term "air conduction sound" means a sound recognized in a human brain by the vibration of an eardrum due to a sound wave (air vibration) which enters an external auditory meatus hole (a so-called "ear hole"). On the other hand, the term "conduction sound" is a sound recognized in a human brain by the vibration of the eardrum due to the vibration of an auricle transmitted to the eardrum. Hereinafter, the air conduction sound and the conduction sound will be described in detail.

FIG. 8 is a view for describing the air conduction sound and the conduction sound. FIG. 8 illustrates a structure of an ear of the user of the electronic apparatus 1. In FIG. 8, a dotted line 400 indicates a conduction path of a sound signal (sound information) of the air conduction sound. A solid line 410 indicates the conduction path of the sound signal of the conduction sound.

When the piezoelectric vibrating element 19 mounted on the cover panel 2 vibrates based on the electric sound signal indicating the reception sound, the cover panel 2 vibrates, and a sound wave is output from the cover panel 2. When the user moves the cover panel 2 of the electronic apparatus 1 close to an auricle 300 of the user by holding the electronic apparatus 1 in a hand, or the cover panel 2 of the electronic apparatus 1 is set to (brought into contact with) the auricle 300 of the user, the sound wave output from the cover panel 2 enters an external auditory meatus hole 310. The sound wave from the cover panel 2 enters in the external auditory meatus hole 310 and the eardrum 320, and the eardrum vibrates. The vibration of the eardrum 320 is transmitted to an auditory ossicle 330 and the auditory ossicle 330 vibrates. In addition, the vibration of the auditory ossicle 330 is transmitted to a cochlea 340 and is converted into an electrical signal in the cochlea 340. The electrical signal is transmitted to the brain by passing through an acoustic nerve 350 and the reception sound is recognized in the brain. In this manner, the air conduction sound is transmitted from the cover panel 2 to the user.

Further, when the user puts the cover panel 2 of the electronic apparatus 1 to the auricle 300 of the user by holding the electronic apparatus 1 in a hand, the auricle 300 is vibrated by the cover panel 2, which is vibrated by the piezoelectric vibrating element 19. The vibration of the auricle 300 is transmitted to the eardrum 320, and thus the eardrum 320 vibrates. The vibration of the eardrum 320 is transmitted to the auditory ossicle 330, and thus the auditory ossicle 330 vibrates. The vibration of the auditory ossicle 330 is transmitted to the cochlea 340 and is converted into an electrical signal in the cochlea 340. The electrical signal is transmitted to the brain by passing through the acoustic nerve 350 and the reception sound is recognized in the brain. In this manner, the conduction sound is transmitted from the cover panel 2 to the user. FIG. 8 illustrates an auricle cartilage 300*a* in the inside of the auricle 300.

Bone conduction sound is a sound recognized in a human brain by the vibration of the skull and direct stimulation of the inner ear such as the cochlea caused by the vibration of the skull. In FIG. 8, in a case of vibrating the jawbone 500, the transmission path of the sound signal while the bone conduction sound is recognized in the brain is indicated with a plurality of arcs 420.

As described above, the air conduction sound and the conduction sound can be transmitted from the cover panel 2 to the user of the electronic apparatus 1 due to the vibration of the cover panel 2 through the vibration of the piezoelectric vibrating element 19. The user can hear the air conduction sound from the cover panel 2 by moving the cover panel 2 close to an ear (auricle). Further, the user can hear the air conduction sound and the conduction sound from the cover panel 2 by bringing the cover panel 2 into contact with an ear (auricle). The structure of the piezoelectric vibrating element 190 according to an example embodiment is contrived to appropriately transmit the air conduction sound and the conduction sound to the user. Various advantages are achieved by configuring the electronic apparatus 1 to transmit the air conduction sound and the conduction sound to the user.

Since the user can hear a sound when the user puts the cover panel 2 to an ear, communication using the electronic apparatus 1 can be performed without much concerning regarding the position of the electronic apparatus 1 with respect to the ear.

In addition, since the user can hear the conduction sound due to the vibration of the auricle, it easy for the user to hear the sound even when there is a large amount of ambient noise. Accordingly, the user can appropriately perform communication even when there is a large amount of the ambient noise.

In addition, even with earplugs or earphones on his/her ears, the user can recognize the reception sound from the electronic apparatus 1 by setting the cover panel 2 to the ear (more specifically, the auricle). Further, even with headphones on his/her ears, the user can recognize the reception sound from the electronic apparatus 1 by putting the cover panel 2 to the headphones.

First Embodiment

The configuration of the electronic apparatus 1 including the cover panel 2 resistant to cracking will now be described. First, the shape of the cover panel 2 according an example embodiment and the second embodiment described below will be described.

<Shape of Cover Panel>

Figure 9:
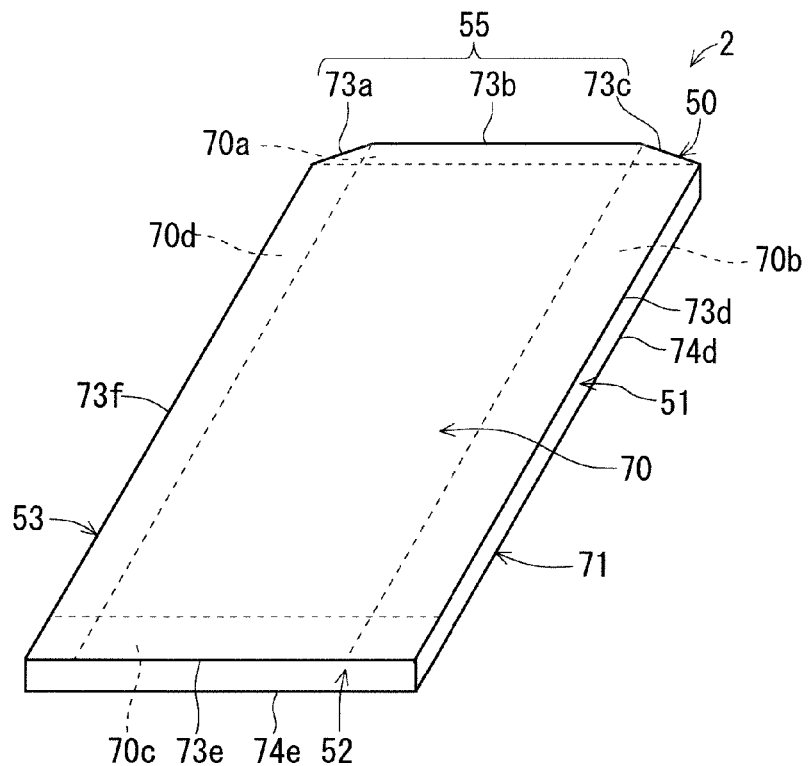
FIG. 9 illustrates a cover panel.
Figure 10:
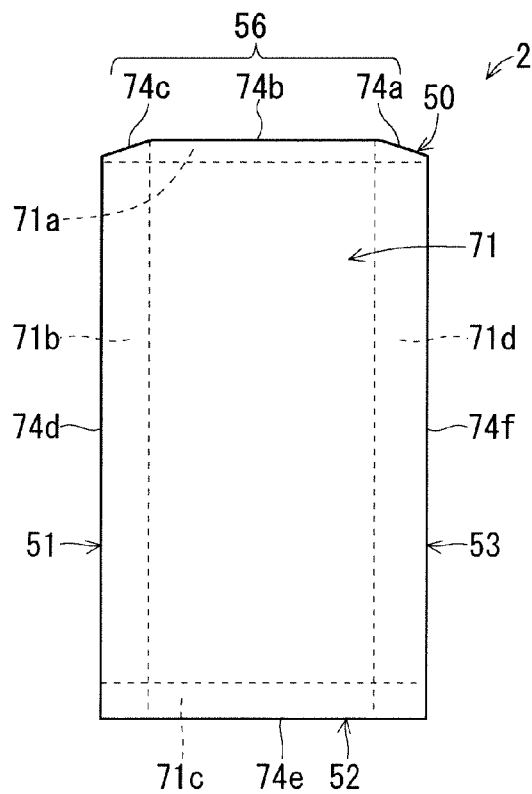
FIG. 10 illustrates the cover panel.

FIGS. 9 and 10 illustrate the cover panel 2. FIG. 9 is a perspective view of the cover panel 2. FIG. 10 is a rear view of the cover panel 2. As illustrated in FIGS. 9 and 10, the cover panel 2 of an example embodiment has a shape obtained by cutting the corners at both upper ends of an approximately rectangular shape. As illustrated in FIG. 9, the outer main surface 70 of the cover panel 2 in an example embodiment has an upper area 70*a*, a right area 70*b*, a lower area 70*c*, and a left area 70*d*. Likewise, as illustrated in FIG. 10, the inner main surface 71 of the cover panel 2 has an upper area 71*a*, a right area 71*b*, a lower area 71*c*, and a left area 71*d*.

As illustrated in FIG. 9, the upper area 70*a* is the upper area of the outer main surface 70 and extends along the short-length direction of the outer main surface 70. The upper area 70*a* includes an upper-left side 73*a*, an upper side 73*b*, and an upper-right side 73*c* forming the upper edge of the outer main surface 70. In an example embodiment, the upper-left side 73a, the upper side 73b, and the upper-right side 73c may be collectively referred to as a "first edge 55." On the other hand, as illustrated in FIG. 10, the upper area 71a is the upper area of the inner main surface 71 and extends along the short-length direction of the inner main surface 71. The upper area 71a faces the upper area 70a. The upper area 71a includes an upper-left side 74a, an upper side 74b, and an upper-right side 74c forming the upper edge of the inner main surface 71. In an example embodiment, the upper-left side 74a, the upper side 74b, and the upper-right side 74c may be collectively referred to as a "second edge 56."

Of the side surfaces of the cover panel 2, the entire portion continuous from the upper area 70a to the upper area 71a is referred to as an "upper side surface 50." In other words, of the side surfaces of the cover panel 2, the entire portion sandwiched between the first edge 55 and the second edge 56 is referred to as an "upper side surface 50."

As illustrated in FIG. 9, the right area 70b is the right area of the outer main surface 70 and extends along the longitudinal direction of the outer main surface 70. The right area 70b includes the upper-right side 73c and a right side 73d forming the right edge of the outer main surface 70. On the other hand, as illustrated in FIG. 10, the right area 71b extends along the longitudinal direction of the inner main surface 71 and faces the right area 70b. The right area 71b includes the upper-right side 74c and a right side 74d forming an edge of the inner main surface 71. Of the side surfaces of the cover panel 2, the entire portion sandwiched between the right side 73d and the right side 74d is referred to as a "right side surface 51."

Referring back to FIG. 9, the lower area 70c is the lower area of the outer main surface 70 and extends along the short-length direction of the outer main surface 70. The lower area 70c includes a lower side 73e forming an edge of the outer main surface 70. On the other hand, as illustrated in FIG. 10, the lower area 71c extends along the short-length direction of the inner main surface 71 and faces the lower area 70c. The lower area 71c includes a lower side 74e being an edge of the inner main surface 71. Of the side surfaces of the cover panel 2, the entire portion continuous from the lower area 70c to the lower area 71c, namely, the entire portion sandwiched between the lower side 73e and the lower side 74e, is referred to as a "lower side surface 52."

Likewise, the left area 70d is the left area of the outer main surface 70 and extends along the longitudinal direction of the outer main surface 70. The left area 70d includes the upper-left side 73a and a left side 73f being an edge of the outer main surface 70. On the other hand, as illustrated in FIG. 10, the left area 71d extends along the longitudinal direction of the inner main surface 71 and faces the left area 70d. The left area 71d includes the upper-left side 74a and a left side 74f being an edge of the inner main surface 71. Of the side surfaces of the cover panel 2, the side surface sandwiched between the left side 73f and the left side 74f is referred to as a "left side surface 53."

As described above, an example embodiment defines that the upper side surface 50 includes the portion sandwiched between the upper-right side 73c and the upper-right side 74c of the side surfaces of the cover panel 2. Alternatively, it may be defined that the right side surface 51 includes the portion sandwiched between the upper-right side 73c and the upper-right side 74c of the side surfaces of the cover panel 2. In this case, the upper side surface 50 does not include the portion sandwiched between the upper-right side 73c and the upper-right side 74c.

Likewise, an example embodiment defines that the upper side surface 50 includes the portion sandwiched between the upper-left side 73a and the upper-left side 74a of the side surfaces of the cover panel 2. Alternatively, it may be defined that the left side surface 53 includes the portion sandwiched between the upper-left side 73a and the upper-left side 74a of the side surfaces of the cover panel 2. In this case, the upper side surface 50 does not include the portion sandwiched between the upper-left side 73a and the upper-left side 74a.

<Cross-Sectional View of Electronic Apparatus>

An internal structure of the electronic apparatus 1 according to the first embodiment will now be described. FIG. 11 is a cross-sectional view of the electronic apparatus 1 according to the first embodiment. FIG. 11 illustrates a cross-section of the electronic apparatus 1, which is taken along an arrow A-A illustrated in FIGS. 1 and 2. To avoid complexity, FIG. 11 does not illustrate a portion of the parts included in the electronic apparatus 1, such as a plurality of cables electrically connecting a plurality of electronic parts to one another.

As illustrated in FIG. 11, the housing 3 of the electronic apparatus 1 according to an example embodiment includes a front housing 3a and a back housing 3b. The front housing 3a and the back housing 3b are connected to each other by being fastened with screws 45 described below. While an example embodiment will describe the case in which the housing 3 includes the front housing 3a and the back housing 3b, the housing 3 may include only one member or three or more members in combination.

The front housing 3a includes a main body 25 that supports the cover panel 2. In the upper area on a front surface 25a of the main body 25 is provided ribs 30 projecting from the main body 25. The cover panel 2 is bonded to the front surface 25a of the main body 25 such that the upper side surface 50 of the cover panel 2 faces the rib 30. In more detail, the peripheral portion of the second main surface 71 of the cover panel 2 is bonded to the front surface 25a of the main body 25. The front housing 3a will be described below in detail. Hereinafter, the front surface 25a of the main body 25 may be referred to as a "front surface 25a of the front housing 3a."

The touch panel 17 and the piezoelectric vibrating element 19 are bonded to the inner main surface 71 of the cover panel 2 with, for example, a double-sided tape or an adhesive. As illustrated in FIG. 11, the piezoelectric vibrating element 19 is disposed in a recess 41 provided in the front surface 25a of the front housing 3a. The surface of the piezoelectric vibrating element 19, which faces the surface facing the cover panel 2, faces the bottom of the recess 41.

In contrast, a first main surface 75 of the display device 16 is disposed to face the surface of the touch panel 17, which is opposite to the surface facing the cover panel 2. As illustrated in FIG. 11, the display device 16 and the touch panel 17 that is bonded to the cover panel 2 are disposed in a recess 42 provided in the front surface 25a of the front housing 3a. A second main surface 76 of the display device 16, which is opposite to the first main surface 75, faces the bottom of the recess 42.

A printed circuit board 22 on which various parts such as the CPU 11 and the DSP 12 are mounted is disposed on the rear surface of the front housing 3a, specifically, the rear surface of the main body 25. The battery 21 is disposed to face the printed circuit board 22. Additionally, the back housing 3b is disposed to face the battery 21.

<Front Housing>

FIG. 12 illustrates an example of the front surface 25a of the front housing 3a. As illustrated in FIG. 12, the main body 25 of the front housing 3a is provided with the ribs 30 and ribs 31, 32, and 33 that project from the main body 25, the recesses 41 and 42, and through holes 43 and 44. The ribs 30 to 33 face the cover panel 2. Hereinafter, the rib may be referred to as a "facing portion." The rib is referred to as a "facing portion 130" in the case where it is not especially necessary to differentiate of the ribs 30 to 33 (facing portions 30 to 33).

In an example embodiment, the front housing 3a and the back housing 3b are connected with the screws 45. As illustrated in FIG. 12, in an example embodiment, the screws 45 are disposed at two end portions in the upper area of the main body 25 of the front housing 3a, which face each other in the short-length direction of the front housing 3a.

For example, when the electronic apparatus 1 is dropped, the front housing 3a and the back housing 3b are each bent, and thus, a force is exerted on the front housing 3a in the direction in which the front housing 3a be separated from the back housing 3b. Meanwhile, a force is exerted on the back housing 3b in the direction in which the back housing 3b is separated from the front housing 3a. As described above, the housing 3 (the front housing 3a and the back housing 3b) is made of resin, which is a relatively soft material. For this reason, differently from the hard material for the cover panel 2 or the like, the housing 3 is prone to deformation upon application of a force exerted on the housing 3 when the electronic apparatus 1 is dropped.

In the case where the front housing 3a and the back housing 3b are connected as in an example embodiment, however, the force that causes the front housing 3a to be separated from the back housing 3b, which occurs when the electronic apparatus 1 is dropped, is suppressed in the portion of the front housing 3a that is connected to the back housing 3b. On the other hand, the force that causes the back housing 3b to be separated from the front housing 3a, which occurs when the electronic apparatus 1 is dropped, is suppressed in the portion of the back housing 3b that is connected to the front housing 3a. As a result, the housing 3 including the front housing 3a and the back housing 3b that are connected to each other is resistant to deformation when the electronic apparatus 1 is dropped. Here, a deformation amount, which occurs in the housing 3 when the electronic apparatus 1 is dropped, becomes smaller as the connecting force that connects the front housing 3a and the back housing 3b to each other is larger. That is, the stiffness of the housing 3 increases as the connecting force that connects the front housing 3a and the back housing 3b to each other becomes larger. The portion of the housing 3, which is closer to the connecting portion between the front housing 3a and the back housing 3b, has higher stiffness.

In the housing 3 of an example embodiment, the front housing 3a and the back housing 3b are connected to each other with the screws 45. In the front housing 3a according to an example embodiment, accordingly, the portions of the front housing 3a at which the screws 45 are disposed deform less when the electronic apparatus 1 is dropped. In other words, in an example embodiment, the stiffness at the end portions in the extension direction in the upper area of the front housing 3a is higher than the stiffness at the central portion in the extension direction of the upper area of the front housing 3a.

The facing portions 30 to 33 may be used for the worker to easily align the cover panel 2 and the front housing 3a when assembling the electronic apparatus 1. The facing portions 30 include a first facing portion 30a and a second facing portion 30b. The first facing portion 30a is disposed at the left-end portion in the short-length direction of the front housing 3a in the upper area of the main body 25 of the front housing 3a. The first facing portion 30a faces the upper side surface 50 of the cover panel 2. The second facing portion 30b is disposed at the right end portion in the short-length direction of the front housing 3a in the upper area of the main body 25 of the front housing 3a. The second facing portion 30b faces the upper side surface 50 of the cover panel 2. The worker can dispose the upper area of the cover panel 2 in a suitable position on the front housing 3a by bringing the first facing portion 30a and the upper side surface 50 into contact with each other and also bringing the second facing portion 30b and the upper side surface 50 into contact with each other. Some gap may be provided between the first facing portion 30a and the upper side surface 50 and between the second facing portion 30b and the upper side surface 50.

Figure 13:
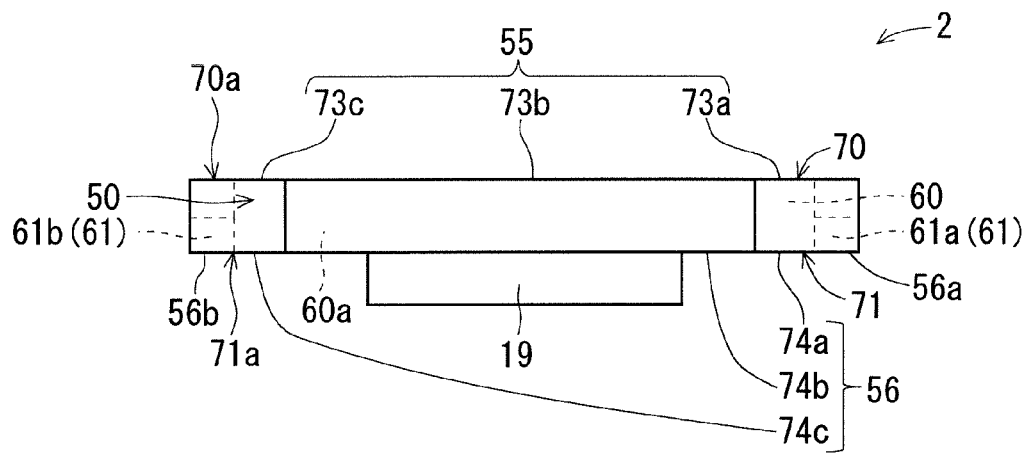
FIG. 13 illustrates an upper side surface of a cover panel and a piezoelectric vibrating element according to the first embodiment.

FIG. 13 illustrates the cover panel 2 and the piezoelectric vibrating element 19. FIG. 13 illustrates the upper side surface 50 of the cover panel 2. As described above, the upper side surface 50 faces the facing portion 30. More specifically, in an example embodiment, a portion 61a, which is continuous with an area 56a being one end in the extension direction of the second edge 56, faces the first facing portion 30a on the upper side surface 50. In addition, a portion 61b, which is continuous with an area 56b being the other end of the second edge 56 in the extension direction, faces the second facing portion 30b on the upper side surface 50. In contrast, the portions other than the portions 61a and 61b do not face the facing portions 30 on the upper side surface 50. In other words, the two ends in the longitudinal direction of the upper side surface 50 are in contact with (face) the facing portions 30. In contrast, the portions in the longitudinal direction of the upper side surface 50 other than the two ends are not in contact with (do not face) the facing portion 30.

Referring back to FIG. 12, the facing portion 31 is disposed in the right area of the main body 25 of the front housing 3a. The facing portion 31 faces the right side surface 51 of the cover panel 2. The worker brings the facing portion 31 and the right side surface 51 into contact with each other, thereby disposing the right area of the cover panel 2 in a suitable position on the front housing 3a. Similarly, the facing portion 32 is disposed in the lower area of the main body 25. The facing portion 32 faces the lower side surface 52 of the cover panel 2. The worker brings the facing portion 32 and the lower side surface 52 into contact with each together, thereby disposing the lower area of the cover panel 2 in a suitable position on the front housing 3a. Similarly, the facing portion 33 is disposed in the left area of the main body 25. The facing portion 33 faces the left side surface 53 of the cover panel 2. The worker brings the facing portion 33 and the left side surface 53 into contact with each other, thereby disposing the left area of the cover panel 2 in a suitable position on the front housing 3a. Some gap may be provided between the facing portion 31 and the right side surface 51, between the facing portion 32 and the lower side surface 52, and between the facing portion 33 and the left side surface 53.

In an example embodiment, the portions on the side surface of the cover panel 2, which do not face the front housing 3a, may be collectively referred to as a "first portion 60." The portions on the side surfaces of the cover panel 2, which face the front housing 3a, may be collectively referred to as a "second portion 61." In an example embodiment, all of the right side surface 51, the lower side surface 52, and the left side surface 53 are the second portion 61. Meanwhile, the upper side surface 50 includes the first portion 60 and the second portion 61. As illustrated in FIG. 13, the portions on the side surfaces of the cover panel 2, which do not face the front housing 3*a* continuously from one end of the outer main surface 70 to one end of the inner main surface 71 that faces the one end of the outer main surface 70, are collectively referred to as a "non-facing portion 60*a*."

In an example embodiment, the worker can easily align the cover panel 2 and the front housing 3*a* using the facing portions 30 to 33 when assembling the electronic apparatus 1. More specifically, the worker can dispose the cover panel 2 in a suitable position on the front housing 3*a* by causing the upper side surface 50 of the cover panel 2 to come into contact with (face) the facing portion 30, causing the right side surface 51 of the cover panel 2 to come into contact with (face) the facing portion 31, causing the lower side surface 52 of the cover panel 2 to come into contact with (face) the facing portion 32, and causing the left side surface 53 of the cover panel 2 to come into contact with (face) the facing portion 33.

The facing portions 30 to 33 may have heights different from one another. More specifically, for example, in the case where the cover panel 2 is bonded to the front housing 3*a*, the facing portions 30 may be lower than the outer main surface 70 of the cover panel 2 (see FIG. 11), the facing portions 31 and 33 may be higher than the outer main surface 70 of the cover panel 2, and the facing portion 32 may be flush with the outer main surface 70 of the cover panel 2. The shapes of the facing portions 30 to 33 are not limited to the shapes illustrated in FIGS. 11 and 12 as long as the worker can align the cover panel 2 and the front housing 3*a* as a result of the facing portions 30 to 33 coming into contact with the side surfaces of the cover panel 2.

The recess 41 is disposed in the upper area of the front surface 25*a* of the front housing 3*a*. The recess 41 has an approximately rectangular shape in a plan view. The piezoelectric vibrating element 19 bonded to the cover panel 2 is disposed in the recess 41. As described above, the piezoelectric vibrating element 19 transmits the reception sound to the user by vibrating the cover panel 2. For this reason, the piezoelectric vibrating element 19 is preferably disposed in a position on the inner main surface 71 of the cover panel 2, in which the piezoelectric vibrating element 19 can easily vibrate the cover panel 2.

In an example embodiment, therefore, as illustrated in FIG. 12, the recess 41 is disposed along a line 48 joining the right area of the first facing portion 30*a* and the left area of the second facing portion 30*b* on the front surface 25*a* of the front housing 3*a*. That is, as illustrated in FIG. 13, the piezoelectric vibrating element 19 is disposed along the portion of the second edge 56, which is continuous with the non-facing portion 60*a*, on the inner main surface 71 of the cover panel 2. As a result, a vibration of the cover panel 2 caused by the piezoelectric vibrating element 19 can be less likely to be interrupted by the front housing 3*a* (facing portion 130). Also in the case where some gap is provided between the side surfaces of the cover panel 2 and the facing portion 130, the vibration of the cover panel 2 may cause the cover panel 2 and the facing portion 130 to come into contact with each other. Therefore, also in the case where some gap is provided between the side surfaces of the cover panel 2 and the facing portion 130, the vibration of the cover panel 2 caused by the piezoelectric vibrating element 19 can be less likely to be interrupted by the front housing 3*a*.

In an example embodiment, the recess 41 and the facing portions 30 (the first facing portion 30*a* and the second facing portion 30*b*) are disposed in the upper area of the front housing 3*a*. However, the positions in which the recess 41 and the facing portions 30 are disposed are not limited to the upper area of the front housing 3*a* and may be, for example, the right area, the left area, and the lower area of the front housing 3*a*. The positions in which the recess 41 and the facing portions 30 are disposed are changed in accordance with the position in which the piezoelectric vibrating element 19 is disposed.

The recess 42 is disposed in the central portion of the front housing 3*a*. The recess 42 has an approximately rectangular shape in a plan view. The electronic parts such as the touch panel 17 and the display device 16 that are bonded to the cover panel 2 are disposed in the recess 42. The electronic parts of the electronic apparatus 1, such as the front imaging unit 4, are disposed in the through holes 43 and 44.

Figure 14:
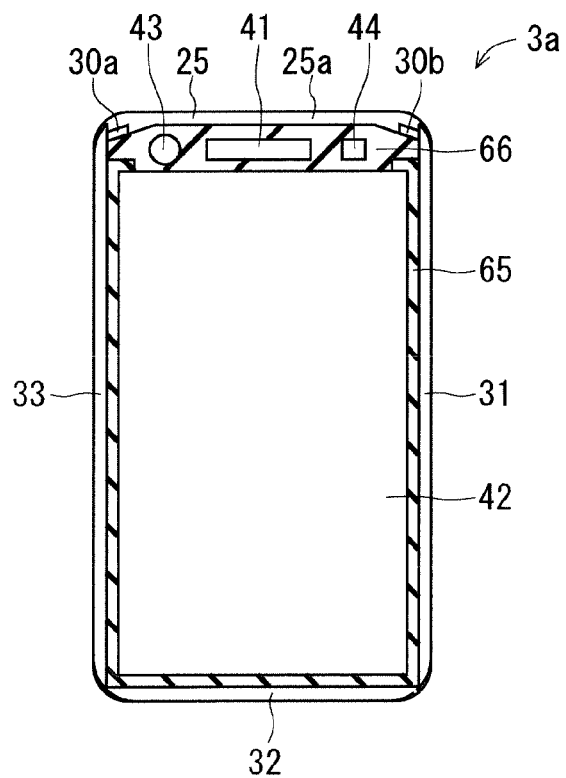
FIG. 14 illustrates the front housing according to the first embodiment.

The bonding between the front housing 3*a* and the cover panel 2 will now be described. An adhesive and a double-sided tape are used to bond the front housing 3*a* and the cover panel 2 to each other. FIG. 14 is a view for describing the bonded portion of the front housing 3*a*. A portion of the front housing 3*a* illustrated in FIG. 14, which is bonded to the cover panel 2 with an adhesive or a double-sided tape, is diagonally shaded.

As illustrated in FIG. 14, a bonding portion to which the cover panel 2 is bonded is provided in the portion of the front surface 25*a* of the front housing 3*a*, which is inside the facing portions 30 to 33. The bonding portion is not provided in the areas of the recesses 41 and 42 and the through holes 43 and 44 in the front housing 3*a*.

In an example embodiment, the front surface 25*a* of the front housing 3*a* has the portion to which the cover panel 2 is bonded with an adhesive and the portion to which the cover panel 2 is bonded with a double-sided tape. As illustrated in FIG. 14, the cover panel 2 is bonded to the first bonding portion 65 on the front surface 25*a* of the front housing 3*a*, which extends along the facing portions 30 to 33, with an adhesive. On the other hand, the cover panel 2 is bonded to the second bonding portion 66 around the recess 41 on the front surface 25*a* of the front housing 3*a*, in which the piezoelectric vibrating element 19 is disposed, with a double-sided tape.

In the electronic apparatus 1, the cover panel 2 may overlap onto the facing portion 130 due to an impact when, for example, the electronic apparatus 1 is dropped, which will be described below in detail. As described above, the cover panel 2 is formed of a material that is hard but is resistant to deformation in many cases. Thus, in the case where the cover panel 2 overlaps onto the facing portion 130 while deforming, the cover panel 2 may crack. For this reason, to cause the cover panel 2 to be resistant to expanding upward even upon application of an impact on the electronic apparatus 1 when, for example, the electronic apparatus 1 is dropped, an adhesive having large adhesion is used for the first bonding portion 65 extending along the facing portions 30 to 33.

Meanwhile, a double-sided tape having adhesion smaller than that of the adhesive is used for the second bonding portion 66 around the recess 41. With the use of a double-sided tape having adhesion smaller than that of the adhesive for bonding between the front housing 3*a* and the cover panel 2 in the second bonding portion 66, the vibration of the cover panel 2 caused by the piezoelectric vibrating element 19 is less likely to be interrupted by the front housing 3*a*.

Figure 15:
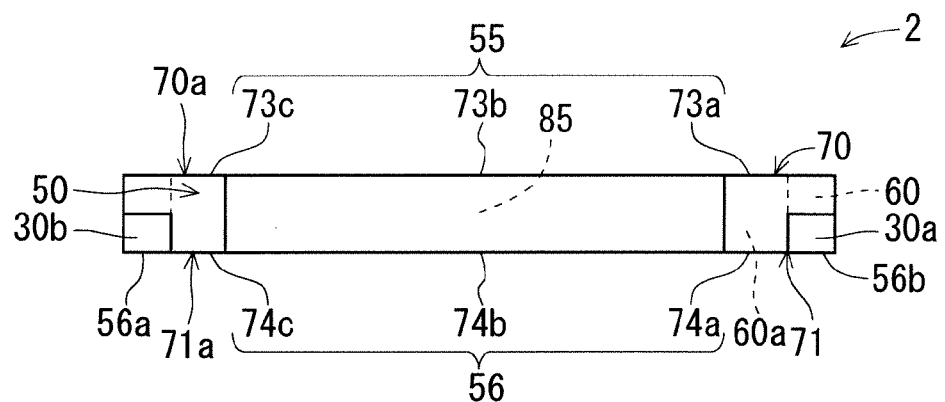
FIG. 15 illustrates the cover panel and a facing portion according to the first embodiment.
Figure 16:
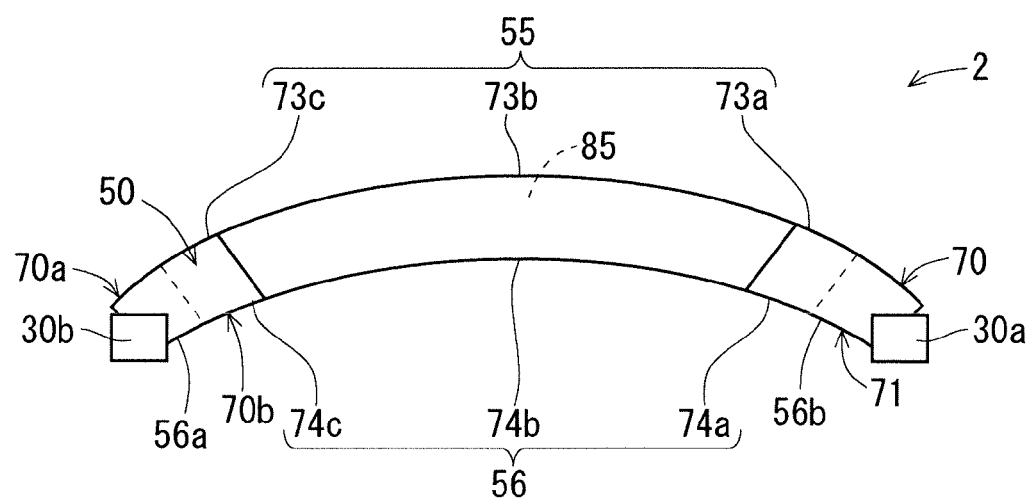
FIG. 16 illustrates the cover panel and the facing portion according to the first embodiment.

As illustrated in FIG. 15, in the electronic apparatus 1 according to an example embodiment, the portion, which continuously extends from the central portion of the upper area 70a in the extension direction of the upper area 70a to the central portion of the upper area 71a in the extension direction of the upper area 71a, is the non-facing portion 60a that does not face the facing portions 30. In other words, a central portion 85 continuous from the central area of the first edge 55 to the central area of the second edge 56 is the non-facing portion 60a. As illustrated in FIG. 16, thus, the facing portions 30 is resistant to sliding into the space below the central portion 85 of the cover panel 2, which is most likely to expand upward when the electronic apparatus 1 is dropped. Therefore, the cover panel 2 can be less likely to overlap onto the facing portion 30. As a result, the cover panel 2 can be less likely to crack.

As illustrated in FIGS. 15 and 16, also in an example embodiment, the facing portions 30 face the end portions that face each other in the longitudinal direction of the upper side surface 50. However, the end portion in the longitudinal direction of the upper side surface 50 is a portion that is resistant to expanding upward if the electronic apparatus 1 is dropped. Therefore, the facing portion 30s is resistant to sliding into the space under the end portion in the longitudinal direction of the upper side surface 50.

As described above, a deformation amount of the housing 3 caused when the electronic apparatus 1 is dropped can be reduced by connecting the front housing 3a and the back housing 3b to each other with the screws 45 (see FIG. 12). Therefore, as in an example embodiment, the facing portions 30 can be less likely to move toward the cover panel 2 due to a deformation when the electronic apparatus 1 is dropped by disposing the screws 45 at the two end portions that face each other in the short-length direction of the front housing 3a, namely, near the facing portions 30, in the upper area of the front housing 3a. The facing portions 30 can be much less likely to slide into the space under the cover panel 2 by reducing a deformation amount of the facing portions 30. As a result, the cover panel 2 is more resistant to overlapping onto the facing portions 30.

Second Embodiment

Figure 17:
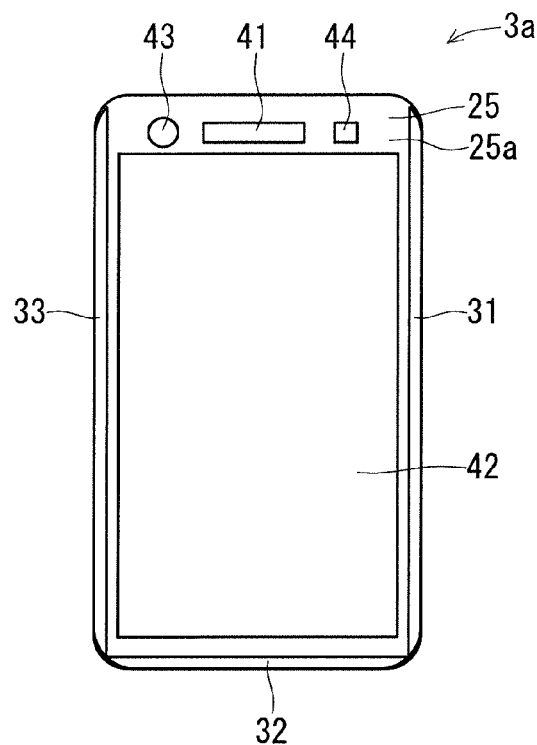
FIG. 17 illustrates a front housing according to a second embodiment.
Figure 18:
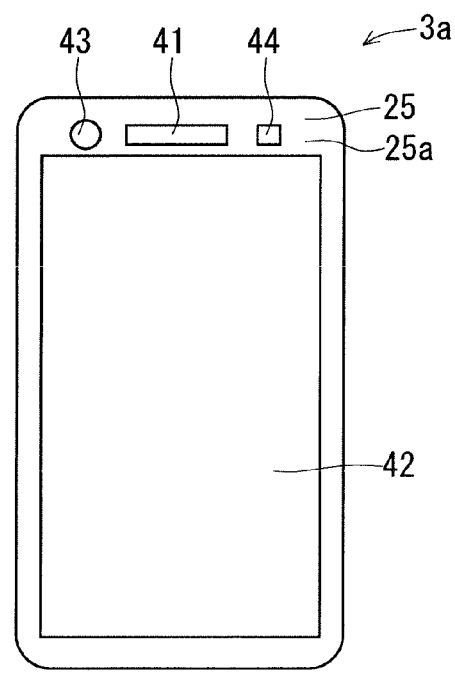
FIG. 18 illustrates another front housing according to the second embodiment.

FIGS. 17 and 18 show the front housing 3a according to the second embodiment. Two examples of the electronic apparatus 1 according to the second embodiment will be described with reference to FIGS. 17 and 18.

The front housing 3a illustrated in FIG. 17 has no facing portion 30, which is different from the front housing 3a described in the first embodiment. In other words, of the upper side surface 50, the entire portion continuous from the first edge 55 to the second edge 56 of the cover panel 2 is the first portion 60. Accordingly, the facing portions 30 are resistant to sliding into the space under the upper side surface 50 of the cover panel 2. As a result, the cover panel 2 is resistant to overlapping onto the facing portions 30. The other components of the electronic apparatus 1 in an example embodiment are similar to those of the first embodiment.

Further, the front housing 3a illustrated in FIG. 17 has no facing portions 30 to 33, which is different from the front housing 3a described in the first embodiment. In other words, all the side surfaces (more specifically, the upper side surface 50, the right side surface 51, the lower side surface 52, and the left side surface 53) of the cover panel 2 are the first portion 60. For this reason, the cover panel 2 is resistant to overlapping onto the facing portions 30 to 33. In the case where the front housing 3a illustrated in FIG. 18 is used, since the cover panel 2 is resistant to overlapping onto the facing portions 30 to 33, the front housing 3a and the cover panel 2 may be bonded to each other with a double-sided tape alone. The cover panel 2 is more likely to vibrate by bonding the front housing 3a and the cover panel 2 to each other with a double-sided alone. The other components of the electronic apparatus 1 in an example embodiment are similar to those of the first embodiment.

The front housing 3a according to the second embodiment is not limited to an examples illustrated in FIGS. 17 and 18 and may be configured such that at least one side surface of the upper side surface 50, the right side surface 51, the lower side surface 52, and the left side surface 53 of the cover panel 2 faces none of the facing portions 30 to 33. The facing portions are resistant to sliding into the space under the side surface of the cover panel 2 that does not face the facing portions. As a result, the cover panel 2 can be less likely to overlap onto the facing portions.

Figure 19:
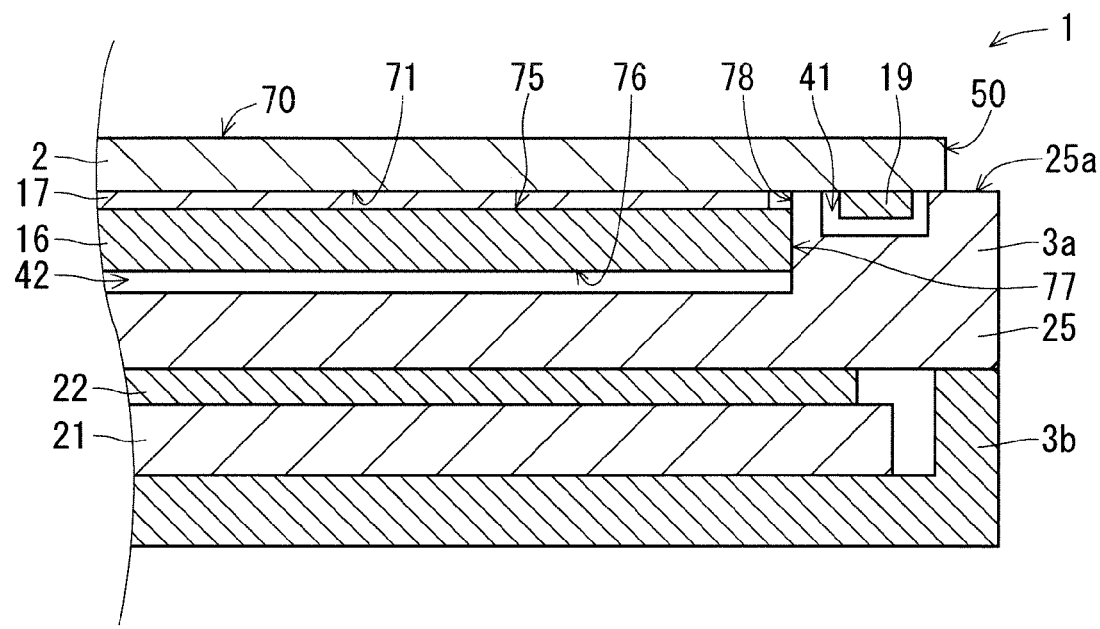
FIG. 19 illustrates a cross-section of an electronic apparatus according to the second embodiment.

The method of aligning the cover panel 2 in the electronic apparatus 1 in the second embodiment will now be described. FIG. 19 illustrates a cross-section of the electronic apparatus 1 according to the second embodiment, which corresponds to FIG. 11. As described above, in the electronic apparatus 1 according to the second embodiment, at least one of the upper side surface 50, the right side surface 51, the lower side surface 52, and the left side surface 53 of the cover panel 2 faces none of the facing portions 30 to 33. Thus, the worker cannot easily align the cover panel 2 and the front housing 3a in some cases.

Therefore, in the electronic apparatus 1 according to an example embodiment, which includes no facing portion 30 facing the upper side surface 50 of the cover panel 2 as illustrated in FIG. 19, the worker can align the cover panel 2 and the front housing 3a without difficulty by following method. When the display device 16 bonded to the inner main surface 71 of the cover panel 2 (more accurately, bonded to the touch panel 17) is disposed in the recess 42 of the front housing 3a, a side surface 77 of the side surfaces of the display device 16, which is continuous with one upper end of the first main surface 75, and a side surface 78 of the inner side surfaces of the recess 42 of the front housing 3a are brought into contact with each other. As illustrated in FIG. 19, not the entire portion of the side surface 77 of the display device 16 may be in contact with the side surface 78 of the recess 42. Which of the side surfaces of the display device 16 is brought into contact with the inner side surface of the recess 42 may be determined in accordance with the position at which no facing portion is located.

Third Embodiment

In the first embodiment described above, in the cover panel 2, the portion, which continuously extends from the central portion of the upper area 70a in the extension direction of the upper area 70a of the outer main surface 70 to the central portion of the upper area 71a in the extension direction of the upper area 71a of the inner main surface 71, is the non-facing portion 60a that does not face the facing portion 30 of the housing 3. The electronic apparatus 1 according to the third embodiment differs from the electronic apparatus 1 according to the first embodiment in the position in which the non-facing portion 60a is provided in the cover panel 2. In the third embodiment, the portion of the side surfaces of the cover panel 2, which is close to a specific part such as the battery 21, is the non-facing portion 60a. Description will now be given of the electronic apparatus 1 according to the third embodiment, mainly of the difference from the electronic apparatus 1 according to the first embodiment.

<Cross-Sectional View of Electronic Apparatus>

Figure 20:
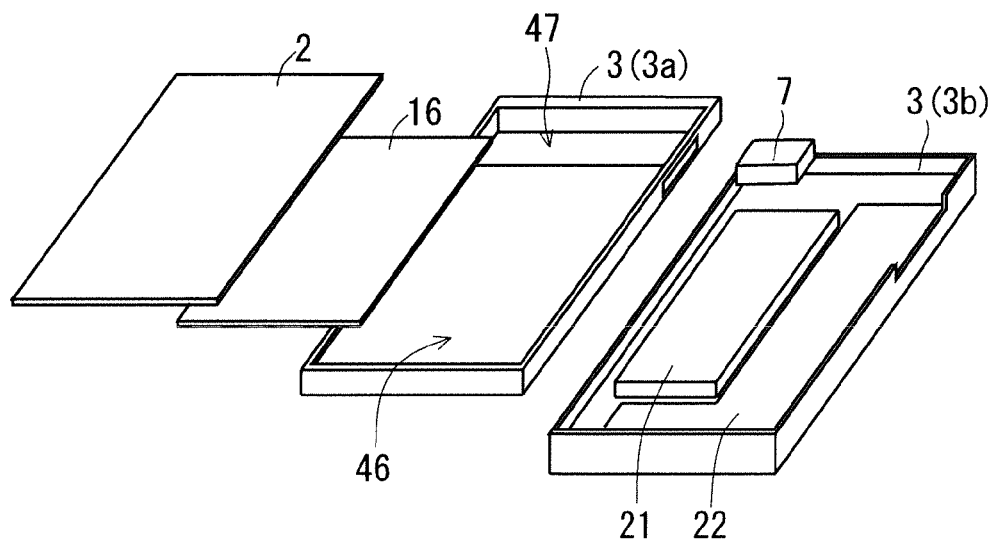
FIG. 20 illustrates an exploded perspective view of an electronic apparatus according to a third embodiment.
Figure 21:
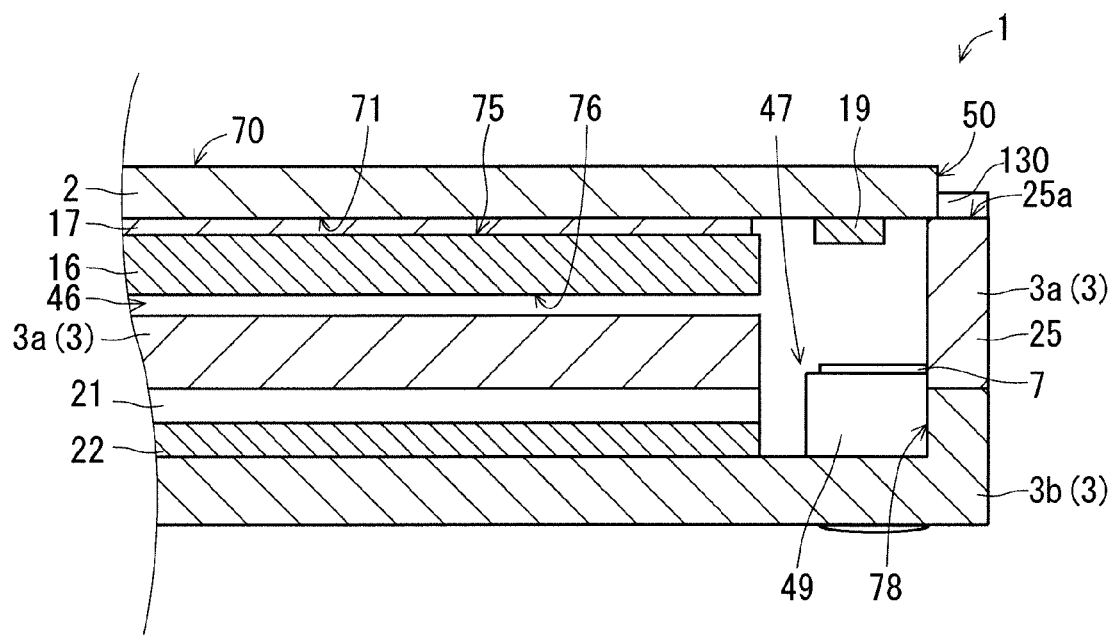
FIG. 21 illustrates a cross-section of the electronic apparatus according to the third embodiment.

First, the structure of the electronic apparatus 1 according to the third embodiment will be described with reference to FIGS. 20 and 21. FIG. 20 is an exploded perspective view of the electronic apparatus 1 according to the third embodiment. FIG. 21 is a cross-sectional view of the electronic apparatus 1 according to the third embodiment. To avoid complexity, FIGS. 20 and 21 do not illustrate a portion of the parts included in the electronic apparatus 1, such as a plurality of cables electrically connecting a plurality of electronic parts to one another.

As in the first embodiment, the housing 3 includes the front housing 3a and the back housing 3b. However, differently from the electronic apparatus 1 according to the first embodiment, the battery 21 and the printed circuit board 22 are fixed to the bottom of the inside of the back housing 3b through screwing or with a double-sided tape, an adhesive, or the like. The front housing 3a is disposed to face the battery 21 and the printed circuit board 22.

The main body 25 of the front housing 3a has an approximately box shape with one surface being opened. The main body 25 has a recess 46 and a through hole 47 provided in the bottom portion of the main body 25. The through hole 47 is provided in such a manner that the parts such as the piezoelectric vibrating element 19 and the rear imaging unit 7 can be less likely to interfere with the front housing 3a. As in the first embodiment, the facing portion 130 provided in the front housing 3a faces the side surfaces of the cover panel 2. The facing portion 130 is provided in the peripheral portion (side-wall portion) of the main body 25. The cover panel 2 to which the touch panel 17, the display device 16, and the piezoelectric vibrating element 19 are bonded is bonded to the front surface 25a of the main body 25 (front housing 3a) such that the side surfaces of the cover panel 2 face the facing portion 130. As a result, the display device 16 faces the bottom of the recess 46 provided in the front housing 3a.

The rear imaging unit 7 is held by a holding structure 49. The holding structure 49 holds the rear imaging unit 7 by a lateral grip force alone. The holding structure 49 surrounds the side surfaces of the rear imaging unit 7. In an example embodiment, a portion of the back housing 3b forms a portion of the holding structure 49. In other words, the holding structure 49 is configured with the back housing 3b. The holding structure 49 may be configured without the back housing 3b.

When assembling the electronic apparatus 1, the worker fits the rear imaging unit 7 into the holding structure 49 to fix the rear imaging unit 7 to the housing 3. As described above, unlike the battery 21 and the printed circuit board 22 described above, the rear imaging unit 7 is not fixed to the housing 3 through screwing, or with a double-sided tape, an adhesive, or the like in an example embodiment. The holding structure 49 may hold the part other than the rear imaging unit 7. For example, the loudspeaker 20 may be held by the holding structure 49.

<Shape of Cover Panel>

Figure 22:
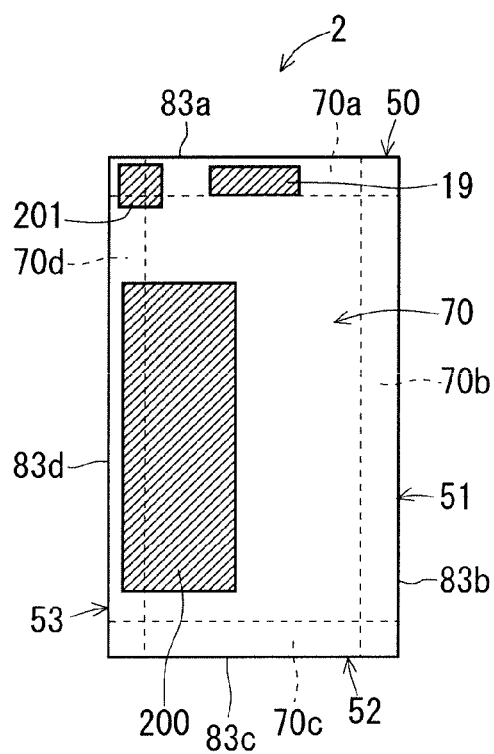
FIG. 22 illustrates a cover panel.
Figure 23:
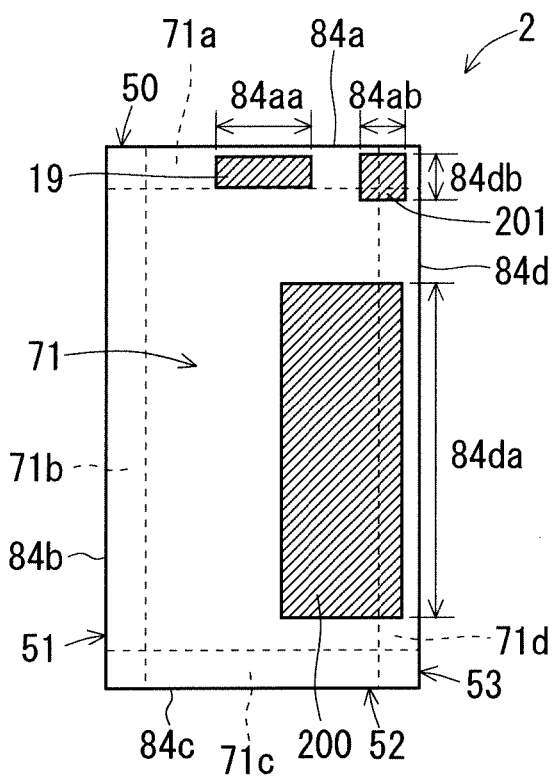
FIG. 23 illustrates the cover panel.

The cover panel 2 according to an example embodiment is a plate-shaped member having an approximately rectangular shape. FIG. 22 is a front view of the cover panel 2, which corresponds to FIG. 9. FIG. 23 is a rear view of the cover panel 2, which corresponds to FIG. 10. In FIGS. 22 and 23, the portion that faces the piezoelectric vibrating element 19, the portion that faces the battery 21, and the portion that faces the rear imaging unit 7 in the cover panel 2 are hatched with lines sloping from right to left.

As illustrated in FIG. 22, the outer main surface 70 of the cover panel 2 in an example embodiment has the upper area 70a, the right area 70b, the lower area 70c, and the left area 70d, similarly to the cover panel 2 in the first embodiment. Likewise, as illustrated in FIG. 23, the inner main surface 71 of the cover panel 2 has the upper area 71a, the right area 71b, the lower area 71c, and the left area 71d. The side surfaces of the cover panel 2 are formed of the upper side surface 50, the right side surface 51, the lower side surface 52, and the left side surface 53.

As illustrated in FIG. 22, the upper area 70a of the outer main surface 70 includes an upper side 83a that forms the upper edge of the outer main surface 70. As illustrated in FIG. 23, the upper area 71a of the inner main surface 71 faces the upper area 70a of the outer main surface 70. The upper area 71a includes an upper side 84a that forms the upper edge of the inner main surface 71.

In an example embodiment, the piezoelectric vibrating element 19 is bonded to the upper area 71a. As illustrated in FIG. 23, the area of the upper side 84a included in the upper area 71a of the inner main surface 71, which faces the piezoelectric vibrating element 19, is referred to as a piezoelectric-vibrating-element facing area 84aa.

Further, the cover panel 2 includes an imaging-unit facing portion 201 that faces the rear imaging unit 7. As illustrated in FIG. 23, the imaging-unit facing portion 201 and the upper area 71a have a portion in which they overlap each other. The area of the upper side 84a included in the upper area 71a of the inner main surface 71, which faces the imaging-unit facing portion 201, is referred to as an imaging-unit facing area 84ab. In other words, in a plan view seen from the inner main surface 71 side, the area of the upper side 84a, which faces the rear imaging unit 7 in the longitudinal direction of the cover panel 2, is the imaging-unit facing area 84ab.

As illustrated in FIG. 22, the right area 70b of the outer main surface 70 includes a right side 83b that forms the right edge of the outer main surface 70. As illustrated in FIG. 23, the right area 71b of the inner main surface 71 includes a right side 84b that forms an edge of the inner main surface 71.

As illustrated in FIG. 22, the lower area 70c of the outer main surface 70 includes a lower side 83c that forms one edge of the outer main surface 70. As illustrated in FIG. 23, the lower area 71c of the inner main surface 71 includes a lower side 84c being an edge of the inner main surface 71.

As illustrated in FIG. 22, the left area 70d of the outer main surface 70 includes a left side 83d being one edge of the outer main surface 70. As illustrated in FIG. 23, the left area 71d of the inner main surface 71 includes a left side 84d being an edge of the inner main surface 71.

The cover panel 2 includes a battery facing portion 200 that faces the battery 21. As illustrated in FIG. 23, the battery facing portion 200 and the left area 71d of the inner main surface 71 have a portion in which they are overlap each other. The area of the left side 83d included in the left area 71d, which faces the battery facing portion 200, is referred to as a battery facing area 84da. In other words, in a plan view seen from the inner main surface 71 side, the area of the left side 83d, which faces the battery 21 in the short-length direction of the cover panel 2, is the battery facing area 84da.

In an example embodiment, the imaging-unit facing portion 201 also overlaps the left area 71d. The area of the left side 83d, which faces the imaging-unit facing portion 201, is referred to as an imaging-unit facing area 84db. In other words, in a plan view seen from the inner main surface 71 side, the area of the left side 83d, which faces the rear imaging unit 7 in the short-length direction of the cover panel 2, is the imaging-unit facing area 84db. In an example embodiment, the distance between the imaging-unit facing portion 201 and the upper side 84a is equal to the distance between the imaging-unit facing portion 201 and the left side 84d.

<Facing Portion of Cover Panel>

Figure 24:
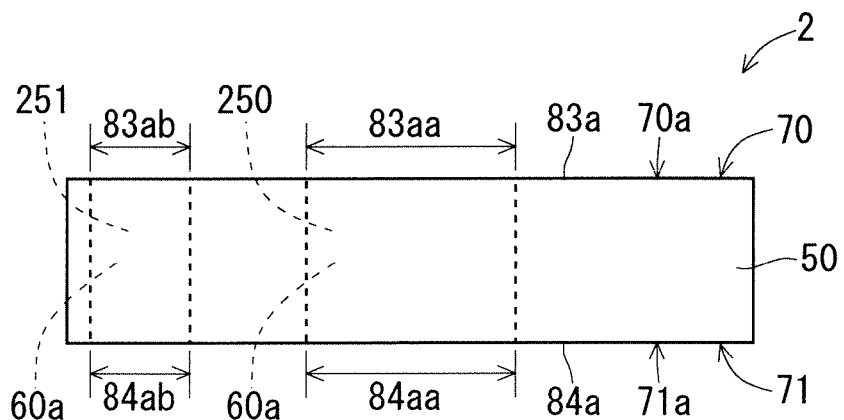
FIG. 24 illustrates an upper side surface of the cover panel.
Figure 25:
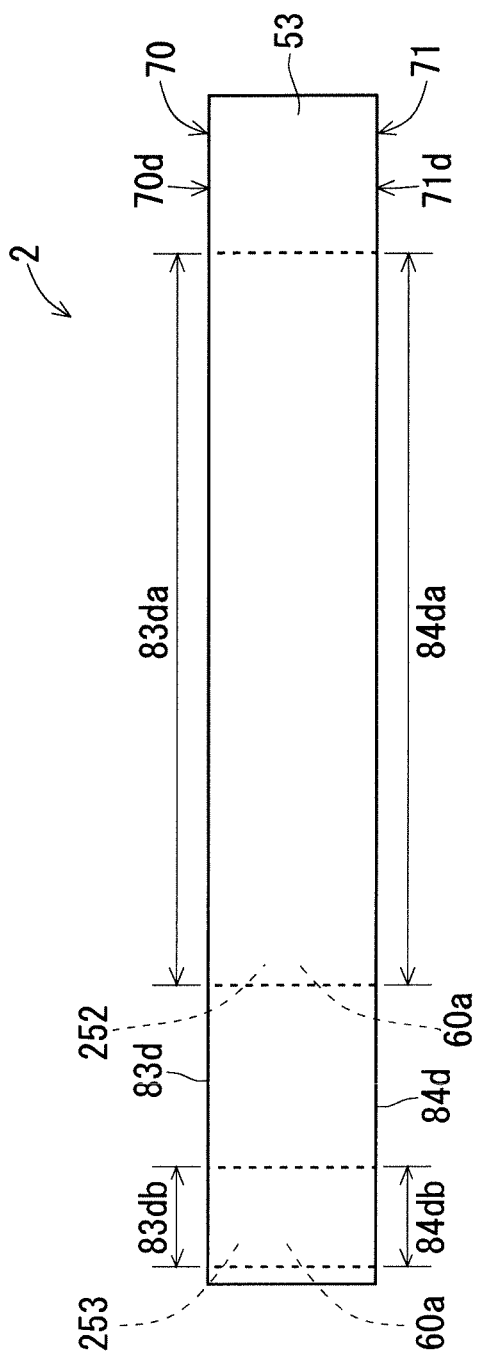
FIG. 25 illustrates a left side surface of the cover panel.
Figure 26:
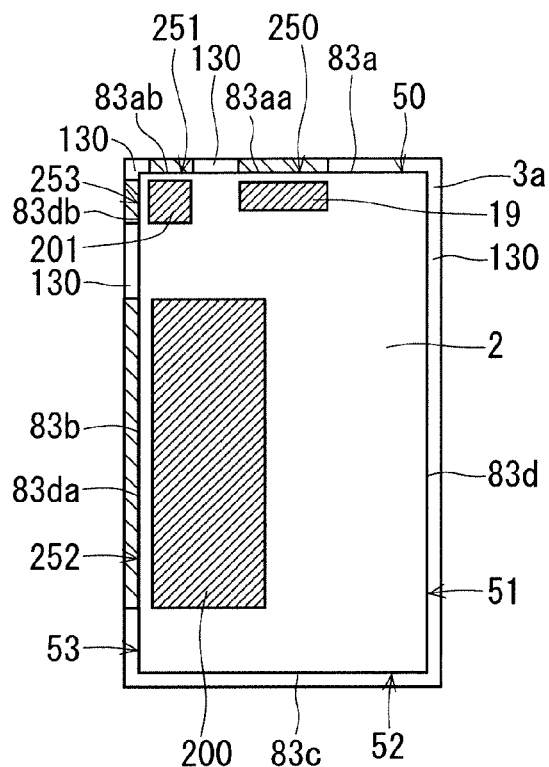
FIG. 26 illustrates a front housing and a cover panel according to the third embodiment.

FIG. 24 illustrates the upper side surface 50 of the cover panel 2. FIG. 25 illustrates the left side surface 53 of the cover panel 2. FIG. 26 illustrates the front housing 3a and the cover panel 2. In FIG. 26, the portions of the peripheral portion of the front housing 3a (main body 25), in which the facing portion 130 is not provided, are hatched with lines sloping from left to right. As illustrated in FIG. 26, in the third embodiment, of the side surfaces of the cover panel 2, the portions close to the piezoelectric vibrating element 19, the battery 21, and the portion (in an example embodiment, the rear imaging unit 7) held by the holding structure 49 are the non-facing portions 60a.

As illustrated in FIG. 24, the portion of the side surfaces of the cover panel 2, which is close to the piezoelectric vibrating element 19, is the portion sandwiched between the piezoelectric-vibrating-element facing area 84aa included in the upper area 71a of the inner main surface 71, in which the piezoelectric vibrating element 19 is disposed, and the piezoelectric-vibrating-element facing area 83aa of the outer main surface 70 (upper area 70a), which faces the piezoelectric-vibrating-element facing area 84aa. In other words, the portion of the upper side surface 50 of the cover panel 2, which is sandwiched between the piezoelectric-vibrating-element facing area 84aa and the piezoelectric-vibrating-element facing area 83aa is the non-facing portion 60a that does not face the facing portion 130 of the housing 3. In other words, the facing portion 130 is not located on the portion of the side walls of the housing 3, which faces the piezoelectric vibrating element 19. In an example embodiment, the portion of the cover panel 2, which is sandwiched between the piezoelectric-vibrating-element facing area 84aa and the piezoelectric-vibrating-element facing area 83aa is referred to as a "piezoelectric-vibrating-element facing side portion 250."

As described in the first embodiment, the piezoelectric vibrating element 19 is preferably disposed at a position of the inner main surface 71 of the cover panel 2, at which the cover panel 2 is easily vibrated. As illustrated in FIG. 24, in an example embodiment, the piezoelectric-vibrating-element facing side portion 250 does not face the facing portion 130 of the housing 3. As a result, a vibration of the cover panel 2 caused by the piezoelectric vibrating element 19 can be less likely to be interrupted by the front housing 3a (facing portion 130).

As illustrated in FIG. 24, the portion of the side surfaces of the cover panel 2, which is close to the part (in an example embodiment, the rear imaging unit 7) held by the holding structure 49, includes the portion sandwiched between the imaging-unit facing area 84ab in the upper area 71a of the inner main surface 71 including a portion overlapping the imaging-unit facing portion 201 and the imaging-unit facing area 83ab that faces the imaging-unit facing area 84ab in the upper area 70a of the outer main surface 70. That is, the portion of the upper side surface 50 of the cover panel 2, which is sandwiched between the imaging-unit facing area 84ab and the imaging-unit facing area 83ab, is the non-facing portion 60a that does not face the facing portion 130 of the housing 3. In other words, the facing portion 130 is not located on the portion of the side walls of the housing 3, which faces the rear imaging unit 7. In an example embodiment, the portion of the cover panel 2, which is sandwiched between the imaging-unit facing area 84ab and the imaging-unit facing area 83ab, is referred to as an "imaging-unit facing side portion 251."

As illustrated in FIG. 25, the portion of the side surfaces of the cover panel 2, which is close to the part held by the holding structure 49, includes the portion sandwiched between the imaging-unit facing area 84db in the left area 71d of the inner main surface 71 including the portion that overlaps the imaging-unit facing portion 201 and the imaging-unit facing area 83db in the left area 70d of the outer main surface 70, which faces the imaging-unit facing area 84db. That is, this portion is the non-facing portion 60a that does not face the facing portion 130 of the housing 3. In an example embodiment, the portion of the cover panel 2, which is sandwiched between the imaging-unit facing area 84db and the imaging-unit facing area 83db, is referred to as an "imaging-unit facing side portion 253."

As described above, the rear imaging unit 7 held by the holding structure 49 is held by only the grip force of the holding structure 49, differently from the battery 21 and the printed circuit board 22. This leads to a risk that the rear imaging unit 7 may not be held by the holding structure 49 upon, for example, impact when the electronic apparatus 1 is dropped, to push the cover panel 2 (imaging-unit facing portion 201) up. In an example embodiment, however, the imaging-unit facing side portion 251 of the upper side surface 50 is the non-facing portion 60a. Thus, even if the rear imaging unit 7 pushes the imaging-unit facing portion 201 up, the imaging-unit facing side portion 251 of the cover panel 2 is resistant to overlapping onto the facing portion 130.

As illustrated in FIG. 25, the imaging-unit facing side portion 253 on the left side surface 53 is the non-facing portion 60a. Thus, even if the rear imaging unit 7 pushes the imaging-unit facing portion 201 up, the imaging-unit facing side portion 253 of the cover panel 2 is resistant to overlapping onto the facing portion 130. As a result, the cover panel 2 is resistant to overlapping onto the facing portion 130 (housing 3), causing the cover panel 2 to be resistant to cracking.

The imaging-unit facing side portion 251 on the upper side surface 50 of the cover panel 2 does not need to be the non-facing portion 60a. The imaging-unit facing side portion 253 on the left side surface 53 of the cover panel 2 does not need to be the non-facing portion 60a. However, in the case where the imaging-unit facing side portion 251 and the imaging-unit facing side portion 253 on the side surfaces of the cover panel 2 are the non-facing portions 60a as in an example embodiment, the cover panel 2 is resistant to overlapping onto the facing portion 130.

As illustrated in FIG. 25, the portion of the side surfaces of the cover panel 2, which is close to the battery 21, is the portion sandwiched between the battery facing area 84ab on the inner main surface 71 including the portion that overlaps the battery facing portion 200 and the battery facing area 83ab that faces the battery facing area 84ab in the upper area 70a of the outer main surface 70. That is, the portion of the left side surface 53 of the cover panel 2, which is sandwiched between the battery facing area 84ab and the battery facing area 83ab, is the non-facing portion 60a that does not face the facing portion 130 of the housing 3. In other words, the facing portion 130 is not located on the portion of the side walls of the housing 3, which faces the battery 21. In an example embodiment, the portion of the cover panel 2, which is sandwiched between the battery facing area 84ab and the battery facing area 83ab, is referred to as a "battery facing side portion 252."

In the case where a lithium ion battery is used as the battery 21, the battery 21 may swell due to charging and discharging of the battery 21 that are repeatedly performed along with the use of the electronic apparatus 1. Swelling of the battery 21 may accordingly push the cover panel 2 (battery facing portion 200) up.

In an example embodiment, the battery facing side portion 252 in the left side surface 53 is the non-facing portion 60a that does not face the facing portion 130. Thus, even if the battery 21 pushes the battery facing portion 200 up, the battery facing side portion 252 is resistant to overlapping onto the facing portion 130 (housing 3). As a result, the cover panel 2 is resistant to overlapping onto the facing portion 130, so that the cover panel 2 is resistant to cracking.

In the embodiment described above, the piezoelectric-vibrating-element facing side portion 250, the imaging-unit facing side portion 251, the battery facing side portion 252, and the imaging-unit facing side portion 253 are the non-facing portions 60a. Alternatively, not all of the piezoelectric-vibrating-element facing side portion 250, the imaging-unit facing side portion 251, the battery facing side portion 252, and the imaging-unit facing side portion 253 may be the non-facing portions 60a. For example, the piezoelectric-vibrating-element facing side portion 250 and the battery facing side portion 252 may be the non-facing portions 60a.

Figure 27:
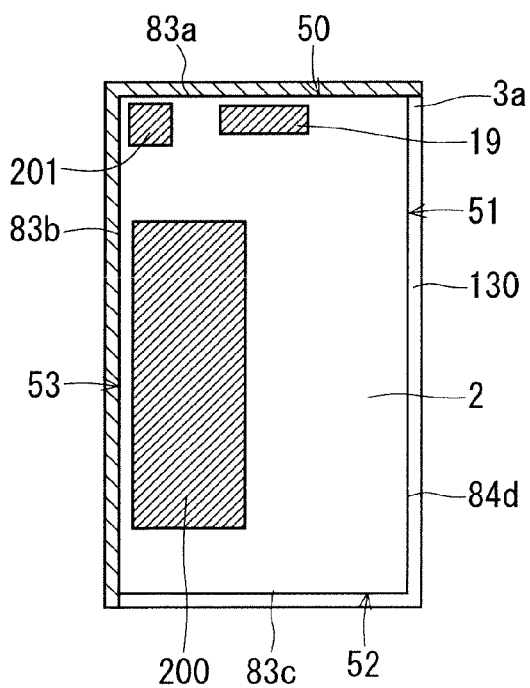
FIG. 27 illustrates the front housing and the cover panel according to the third embodiment.

Unlike the embodiment described above, of the four side surfaces of the cover panel 2, a side surface closest to the piezoelectric vibrating element 19, a side surface closest to the battery 21, and a side surface closest to the rear imaging unit 7 may be the non-facing portions 60a. FIG. 27 illustrates the front housing 3a and the cover panel 2 in this case.

In an example illustrated in FIG. 27, of the four side surfaces of the cover panel 2, the upper side surface 50 closest to the piezoelectric vibrating element 19 and the rear imaging unit 7 is the non-facing portion 60a. In addition, of the four side surfaces of the cover panel 2, the left side surface 53 closest to the battery 21 and the rear imaging unit 7 is the non-facing portion 60a. As described above, a side surface closest to the piezoelectric vibrating element 19, a side surface closest to the battery 21, and a side surface closest to the rear imaging unit 7 of a plurality of side surfaces that form the cover panel 2 are configured as the non-facing portions 60a, so that the cover panel 2 is more resistant to overlapping onto the facing portion 130.

All of a side surface closest to the piezoelectric vibrating element 19, a side surface closest to the battery 21, and a side surface closest to the rear imaging unit 7 of the four side surfaces of the cover panel 2 are not necessarily be the non-facing portions 60a. As an example, of the four side surfaces of the cover panel 2, only the side surface closest to the piezoelectric vibrating element 19 may be the non-facing portion 60a. In one example, of the four side surfaces of the cover panel 2, only a side surface closest to the battery 21 may be the non-facing portion 60a. In another example, of the four side surfaces of the cover panel 2, only a side surface closest to the rear imaging unit 7 may be the non-facing portion 60a.

In such a case, as in the second embodiment, the cover panel 2 may be aligned by bringing the side surface of the display device 16 fixed to the cover panel 2 into contact with the inner side surface of the housing 3. Which of the side surfaces of the display device 16 is brought into contact with the inner side surface of the housing 3 may be determined according to a position in which the facing portion 130 is not located.

While the upper side surface 50 and the left side surface 53 of the four side surfaces of the cover panel 2 are the non-facing portions 60a in an example illustrated in FIG. 27, the portion being the non-facing portion 60a is not limited to them. For example, all of the four side surfaces of the cover panel 2 may be the non-facing portions 60a according to the position in which the part such as the piezoelectric vibrating element 19 is disposed.

Fourth Embodiment

In the first to third embodiments described above, the cover panel 2 is bonded to the housing 3 (front housing 3a). The fourth embodiment will describe the case in which the cover panel 2 is fixed to the housing 3 via the panel fixing member for fixing the cover panel 2 to the housing 3. An example embodiment will describe a case in which the housing 3 is formed of one member. Description will now be given of the electronic apparatus 1 according to the fourth embodiment, mainly of a difference from the electronic apparatus 1 according to the third embodiment.

<Cross-Sectional View of Electronic Apparatus>

First, the structure of the electronic apparatus 1 according to an example embodiment will be described with reference to FIGS. 28 and 29. FIG. 28 illustrates an exploded perspective view of the electronic apparatus 1 according to the fourth embodiment. FIG. 29 is a cross-sectional view of the electronic apparatus 1 according to the fourth embodiment. To avoid complexity, FIGS. 28 and 29 do not illustrate a portion of the parts included in the electronic apparatus 1, such as a plurality of cables electrically connecting a plurality of electronic parts to one another.

As illustrated in FIGS. 28 and 29, the housing 3 according to an example embodiment has an approximately box shape with one surface being opened. As in the third embodiment, the battery 21 and the printed circuit board 22 are fixed to the bottom inside of the housing 3 through screwing or with a double-sided tape, an adhesive, or the like.

Then, a plate-shaped member 23 is disposed to face the battery 21 and the printed circuit board 22. The plate-shaped member 23 is provided for suppressing deforming and cracking of the cover panel 2 due to a load from the outside, and is made of, for example, a metal material such as stainless steel (SUS). The plate-shaped member 23 has the same size as the second main surface 76 of the display device 16. The display device 16 is disposed to face the plate-shaped member 23. Then, the touch panel 17 and the cover panel 2 are disposed to face the display device 16. For example, the cover panel 2 is fixed to the housing 3 with a panel fixing member 24, with the touch panel 17, the display device 16, and the plate-shaped member 23 being fixed to the inner main surface 71.

The panel fixing member 24 fixes the cover panel 2 to the housing 3. That is, the cover panel 2 is fixed to the housing 3 via the panel fixing member 24. A front surface 24a of the panel fixing member 24 has a portion to be bonded to the cover panel 2 and the facing portion 130 that faces the cover panel 2. The cover panel 2 is fixed to the front surface 24a of the panel fixing member 24 with a double-sided tape, an adhesive, or the like. The portion to be bonded to the cover panel 2 and the facing portion 130, which are provided in the front surface 24a of the panel fixing member 24, will be described below in detail.

Figure 30:
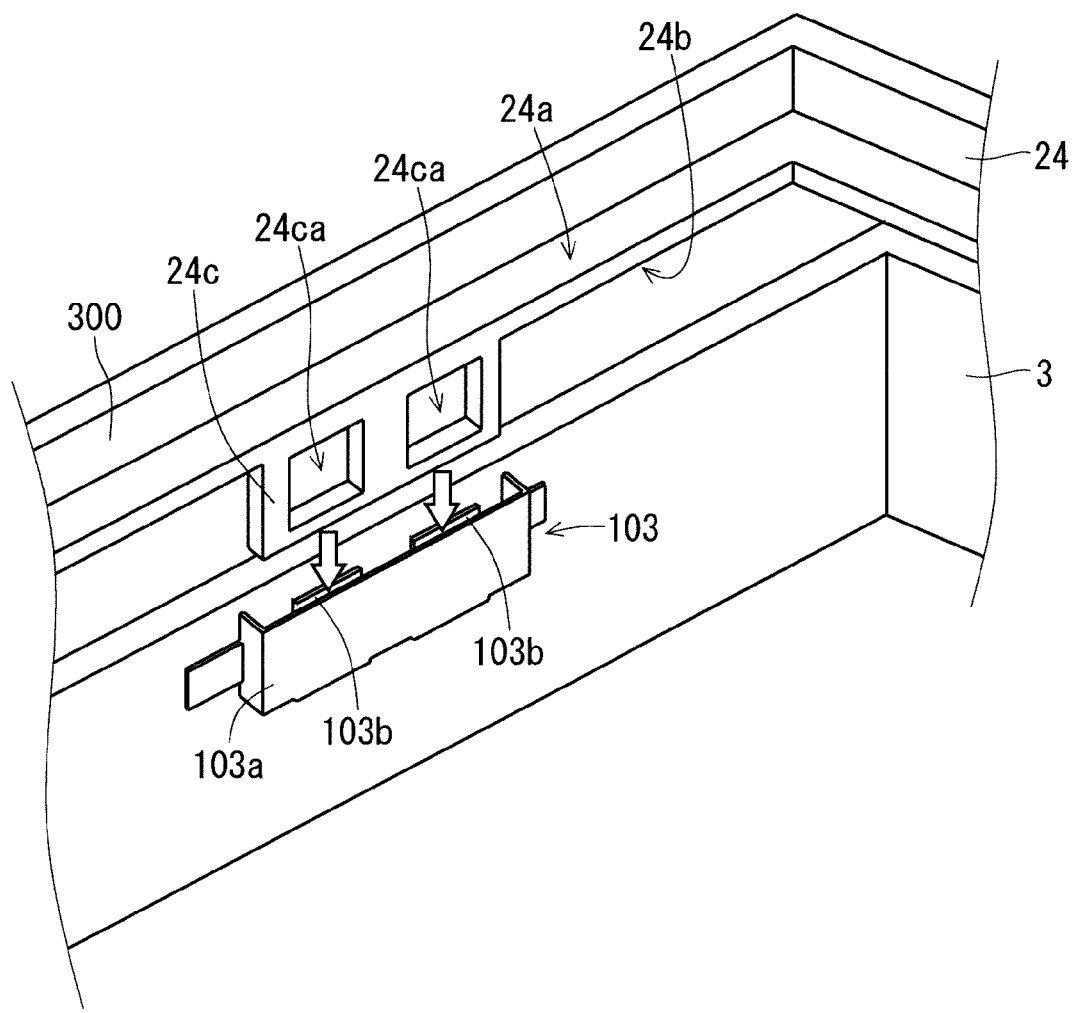
FIG. 30 illustrates a view for describing fixing of a panel fixing member to a housing.

A rear surface 24b of the panel fixing member 24 has a panel-fixing-member-side fixing portion for fixing the panel fixing member 24 to the housing 3. FIG. 30 is a view for describing an example of the method of fixing the panel fixing member 24 to the housing 3.

In an example illustrated in FIG. 30, a housing-side fixing portion 103 for fixing the panel fixing member 24 to the housing 3 is provided on an inner side surface of the housing 3. The housing-side fixing portion 103 has a body portion 103a and bent portions 103b formed by bending portions of the body portion 103a. The distance between the body portion 103a and each of the bent portions 103b is smaller on the front surface side of the electronic apparatus 1 and is larger on the rear surface side of the electronic apparatus 1.

Provided on the rear surface 24b of the panel fixing member 24 is a panel-fixing-member-side fixing portion 24c. The panel-fixing-member-side fixing portion 24c has such a shape as to be inserted between the body portion 103a and each of the bent portions 103b of the housing-side fixing portion 103. The panel-fixing-member-side fixing portion 24c is provided with through holes 24ca through which the bent portions 103b pass.

As illustrated in FIG. 30, when the panel-fixing-member-side fixing portion 24c is inserted into the housing-side fixing portion 103, initially, the panel-fixing-member-side fixing portion 24c is sandwiched between the body portion 103a and the bent portions 103b of the housing-side fixing portion 103, whereby the bent portions 103b momentarily become apart from the body portion 103a. However, when the panel-fixing-member-side fixing portion 24c is inserted up to a suitable position, the bent portions 103b pass through the through holes 24ca to return to the original position. That is, the panel-fixing-member-side fixing portion 24c is fixed to the housing-side fixing portion 103 by inserting the panel-fixing-member-side fixing portion 24c into the housing-side fixing portion 103 to cause the bent portions 103b to pass through the through holes 24ca of the panel-fixing-member-side fixing portion 24c. The fixing of the panel fixing member 24 to the housing 3 is not limited to an example described above. For example, the panel fixing member 24 may be fixed to the housing 3 through screwing or with an adhesive or the like.

<Panel Fixing Member>

Figure 31:
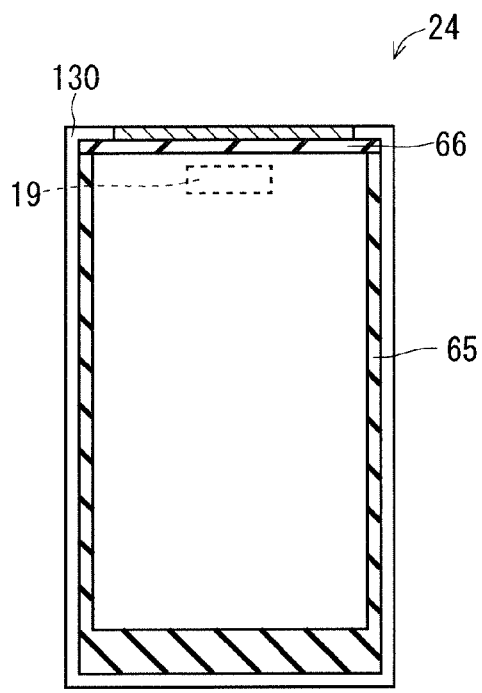
FIG. 31 illustrates a panel fixing member and a cover panel according to the fourth embodiment.

FIG. 31 illustrates the front surface 24a of the panel fixing member 24 according to the fourth embodiment. The panel fixing member 24 is fixed to a terminal end of the inner main surface 71 of the cover panel 2. More specifically, as in the first embodiment, an adhesive is used for the first bonding portion 65 of the panel fixing member 24 to which the right area 71b, the lower area 71c, and the left area 71d of the cover panel 2 are fixed. Meanwhile, a double-sided tape is used for the second bonding portion 66 to which the upper area 71a of the cover panel 2 is fixed. Since the piezoelectric vibrating element 19 is disposed in the upper area 71 a, with the use of a double-sided tape having smaller adhesion than that of an adhesive for bonding between the panel fixing member 24 and the cover panel 2 in the upper area 71a (second bonding portion 66), a vibration of the cover panel 2 caused by the piezoelectric vibrating element 19 is less likely to be interrupted by the panel fixing member 24.

The facing portion 130 that faces the side surfaces of the cover panel 2 is provided on the front surface 24a of the panel fixing member 24. As in the first embodiment, the portion other than two ends of the upper side surface 50 of the cover panel 2 in the longitudinal direction is not contact with (does not face) the facing portion 130 in an example embodiment, which is not limited thereto.

As described above, the cover panel 2 can be less likely to overlap onto the facing portion 130 by configuring the portion of the upper side surface 50 that continuously extends from the central portion of the upper area 70a in the extension direction of the upper area 70a of the outer main surface 70 to the central portion of the upper area 71a in the extension direction of the upper area 71a of the inner main surface 71, which is most likely to expand upward when the electronic apparatus 1 is dropped, as the non-facing portion 60a that does not face the facing portion 130. In other words, the cover panel 2 can be less likely to overlap onto the facing portion 130 because the facing portion 130 is not located in the central portion in the short-length direction of the panel fixing member 24 in the upper area of the panel fixing member 24. As a result, the cover panel 2 can be less likely to crack in an example embodiment as in the first embodiment. Further, a vibration of the cover panel 2 caused by the piezoelectric vibrating element 19 disposed in the central portion of the upper area 71a in the extension direction of the upper area 71a can be less likely to be interrupted by the facing portion 130.

Figure 32:
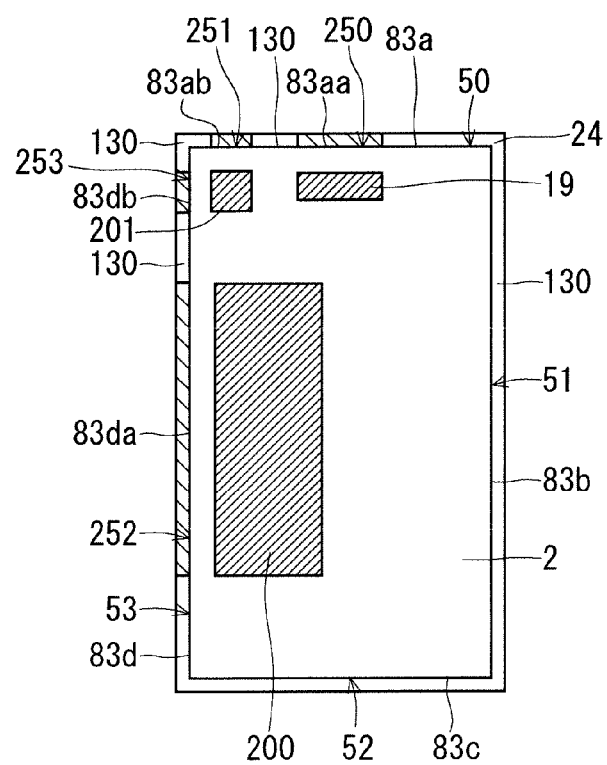
FIG. 32 illustrates the panel fixing member and the cover panel according to the fourth embodiment.
Figure 33:
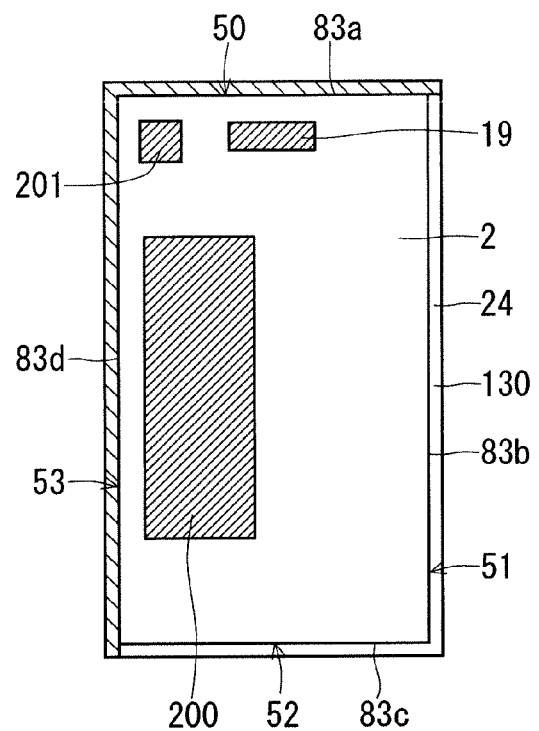
FIG. 33 illustrates the panel fixing member and the cover panel according to the fourth embodiment.
Figure 34:
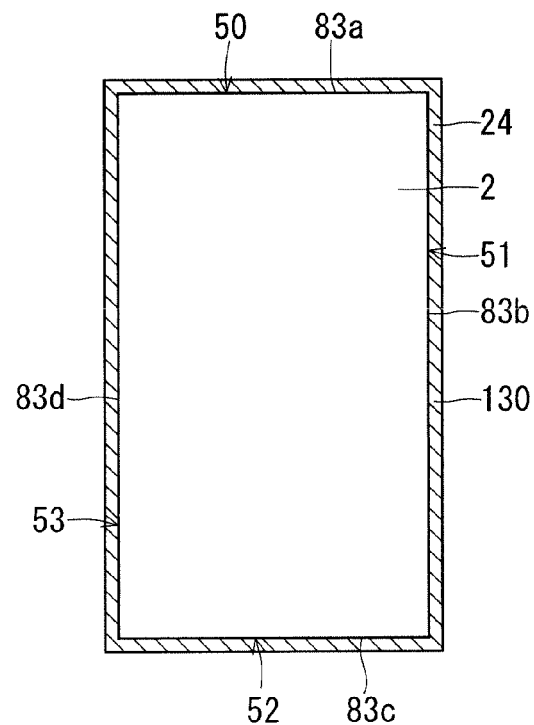
FIG. 34 illustrates the panel fixing member and the cover panel according to the fourth embodiment.

Alternatively, the panel fixing members 24 as illustrated in FIGS. 32 to 34 may be used. FIGS. 32 to 34 each illustrate the panel fixing member 24 and the cover panel 2 according to the fourth embodiment. In FIGS. 32 to 34, the portions of the peripheral portion of the front surface 24a of the panel fixing member 24, in which the facing portion 130 is not provided, are hatched with lines sloping from left to right.

In an example illustrated in FIG. 32, as in the third embodiment, the portions of the side surfaces of the cover panel 2, which are close to the piezoelectric vibrating element 19, the battery 21, and the part (in an example embodiment, the rear imaging unit 7) held by the holding structure 49, are the non-facing portions 60a.

More specifically, the piezoelectric-vibrating-element facing side portion 250 of the side surfaces of the cover panel 2, which is close to the piezoelectric vibrating element 19, is the non-facing portion 60a (see FIG. 24). In other words, the facing portion 130 is not located in the portion of the peripheral portion of the panel fixing member 24, which is close to the piezoelectric vibrating element 19. Also in an example embodiment, thus, a vibration of the cover panel 2 caused by the piezoelectric vibrating element 19 is less likely to be interrupted by the panel fixing member 24.

The imaging-unit facing side portion 251 and the imaging-unit facing side portion 253 of the side surfaces of the cover panel 2, which are close to the rear imaging unit 7, are the non-facing portions 60a (see FIGS. 24 and 25). In other words, the facing portion 130 is not located in the portion of the peripheral portion of the panel fixing member 24, which is close to the rear imaging unit 7. Thus, even if the rear imaging unit 7 is not held by the holding structure 49 and then pushes the cover panel 2 up due to, for example, an impact when the electronic apparatus 1 is dropped, the imaging-unit facing side portion 251 and the imaging-unit facing side portion 253 are resistant to overlapping onto the panel fixing member 24. As a result, also in an example embodiment, the cover panel 2 is resistant to overlapping onto the panel fixing member 24, causing the cover panel 2 to be resistant to cracking.

The battery facing side portion 252 of the side surfaces of the cover panel 2, which is close to the battery 21, is the non-facing portion 60a (see FIG. 25). In other words, the facing portion 130 is not located in the portion of the peripheral portion of the panel fixing member 24, which is close to the battery 21. Accordingly, even if the battery 21 swells due to repeatedly-performed charging and discharging and pushes the cover panel 2 up, the battery facing side portion 252 is resistant to overlapping onto the panel fixing member 24. As a result, also in an example embodiment, the cover panel 2 is resistant to overlapping onto the panel fixing member 24, causing the cover panel 2 to be resistant to cracking.

Also in an example embodiment, not all of the piezoelectric-vibrating-element facing side portion 250, the imaging-unit facing side portion 251, the battery facing side portion 252, and the imaging-unit facing side portion 253 may be the non-facing portions 60a.

In an example illustrated in FIG. 33, of the four side surfaces of the cover panel 2, a side surface closest to the piezoelectric vibrating element 19, a side surface closest to the battery 21, and a side surface closest to the rear imaging unit 7 are the non-facing portions 60a.

More specifically, of the four side surfaces of the cover panel 2, the upper side surface 50 closest to the piezoelectric vibrating element 19 and the rear imaging unit 7 is the non-facing portion 60a. In addition, of the four side surfaces of the cover panel 2, the left side surface 53 closest to the battery 21 and the rear imaging unit 7 is the non-facing portion 60a. As described above, of a plurality of side surfaces forming the cover panel 2, a side surface closest to the piezoelectric vibrating element 19, a side surface closest to the battery 21, and a side surface closest to the rear imaging unit 7 are configured as the non-facing portions 60a, so that the cover panel 2 is resistant to overlapping onto the facing portion 130 also in an example embodiment.

The facing portion 130 is not located in the panel fixing member 24 illustrated in FIG. 34, as in the second embodiment. Therefore, the cover panel 2 does not overlap onto the facing portion 130.

As described above, at least one side surface of the four side surfaces of the cover panel 2 is the non-facing portion 60a in the panel fixing members 24 illustrated in FIGS. 33 and 34. The method of aligning the cover panel 2 in the case where the electronic apparatus 1 includes the panel fixing member 24 as illustrated in FIG. 33 or 34 will now be described.

FIG. 35 illustrates a cross-section of the electronic apparatus 1 without the facing portion 130 that faces the upper side surface 50. As in the second embodiment, the electronic apparatus 1 includes no facing portion 130 that faces the upper side surface 50 as described above. When the display device 16 bonded to the inner main surface 71 of the cover panel 2 (more precisely, bonded to the touch panel 17) is fixed to the housing 3 via the panel fixing member 24, the side surface 77 of the display device 16, which is continuous with one upper end of the first main surface 75, and the side surface 78 of the inner side surfaces of the housing 3, which faces the side surface 77, are brought into contact with each other. Which of the side surfaces of the display device 16 is brought into contact with the inner side surface of the recess 42 according to a position in which the facing portion is not located may be determined according to a position in which the facing portion 130 is not located.

<<Modifications>>

Figure 37:
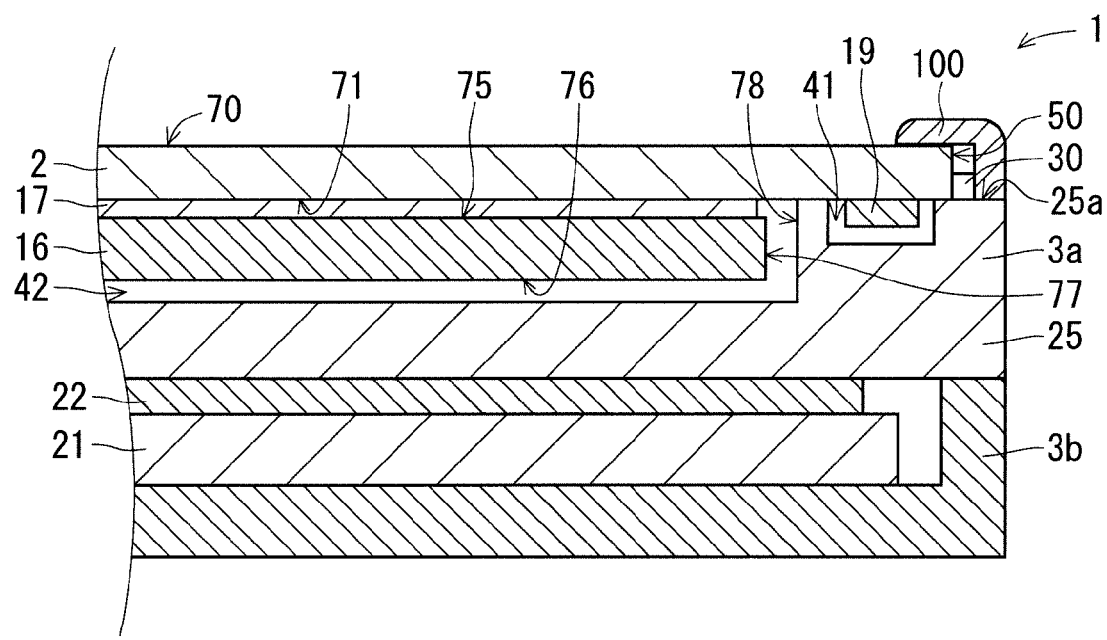
FIG. 37 illustrates a cross-section of an electronic apparatus according to the modification.

FIG. 36 is a front view of an external appearance of the electronic apparatus 1 according to a modification, which corresponds to FIG. 1. FIG. 37 illustrates a cross-section of the electronic apparatus 1 according to the modification. FIG. 37 illustrates a cross-section of the electronic apparatus 1, which is taken along an arrow B-B illustrated in FIG. 36. To avoid complexity, FIG. 37 does not illustrate a portion of the parts included in the electronic apparatus 1, such as a plurality of cables electrically connecting a plurality of electronic parts to one another, as in FIG. 11.

As illustrated in FIGS. 36 and 37, the electronic apparatus 1 according to this modification includes a cover member 100 that covers the facing portion 30 and the upper area of the cover panel 2. The cover member 100 is mounted on, for example, the front housing 3a. The cover member 100 is made of, for example, a resin similarly to the housing 3. The other components of the electronic apparatus 1 in this modification are similar to those of the first embodiment.

Providing the cover member 100 to the electronic apparatus 1 improves the designability of the electronic apparatus 1. In the electronic apparatus 1 according to the first embodiment, the facing portion 30 is not located in the central portion 85 of the upper side surface 50. Thus, the electronic apparatus 1 according to the first embodiment, which includes the cover member 100, has a higher degree of flexibility in shape (design) of the cover member 100. This leads to more improved designability of the electronic apparatus 1.

The cover member 100 may be employed not in the first embodiment but in the second to fourth embodiments.

While the electronic apparatus 1 has been described in detail, the foregoing description is in all aspects illustrative and not restrictive. The embodiment and modifications described above may be combined with one another, as long as they are not mutually exclusive. It is therefore understood that numerous modifications and variations can be devised without departing from the scope of embodiments of the present disclosure.

The invention claimed is:

1. An electronic apparatus comprising:
 a panel including a first main surface, a second main surface opposite to said first main surface, and side surfaces that connect said first main surface and said second main surface;
 a display located on said second main surface side of said panel; and
 a housing configured to house said display and hold said panel,
 wherein at least one of said side surfaces of said panel includes a first portion that does not face said housing, the non-facing first portion continuously extending from a center portion of the first main surface to a center portion of the second main surface of said panel.

2. The electronic apparatus according to claim 1, wherein
 said display includes a third main surface facing said panel and a fourth main surface opposite to said third main surface,
 said housing has a recess in which said display is housed, and
 a surface of said display connecting said third and fourth main surfaces is in contact with at least part of an inner side surface of said recess.

3. The electronic apparatus according to claim 2, wherein all of said side surfaces are said first portion.

4. The electronic apparatus according to claim 2, further comprising a battery housed in said housing,
 wherein a side surface closest to said battery of said side surfaces includes said first portion.

5. The electronic apparatus according to claim 2, further comprising an imaging unit located in said housing,
 wherein a side surface closest to said imaging unit of said side surfaces includes said first portion.

6. The electronic apparatus according to claim 5, further comprising a holding structure located in said housing and configured to hold said imaging unit by a grip force alone.

7. An electronic apparatus comprising:
- a panel including a first main surface, a second main surface opposite to said first main surface, and side surfaces that connect said first main surface and said second main surface;
- a display located on said second main surface side of said panel; and
- a housing configured to house said display and hold said panel,
- wherein at least one of said side surfaces of said panel includes a first portion that does not face said housing,
- a battery housed in said housing,
- said display includes a third main surface facing said panel and a fourth main surface opposite to said third main surface,
- said housing has a recess in which said display is housed,
- a surface of said display connecting said third and fourth main surfaces is in contact with at least part of an inner side surface of said recess,
- an imaging unit located in said housing,
- wherein a side surface closest to said imaging unit of said side surfaces includes said first portion,
- a holding structure located in said housing and configured to hold said imaging unit by a grip force alone,
- a piezoelectric vibrating element located on said panel,
- wherein a side surface closest to said piezoelectric vibrating element of said side surfaces includes said first portion.

8. An electronic apparatus comprising:
- a panel including a first main surface, a second main surface opposite to said first main surface, and side surfaces that connect said first main surface and said second main surface;
- a display located on said second main surface side of said panel; and
- a housing configured to house said display and hold said panel,
- wherein at least one of said side surfaces of said panel includes a first portion that does not face said housing,
- a battery housed in said housing,
- said display includes a third main surface facing said panel and a fourth main surface opposite to said third main surface,
- said housing has a recess in which said display is housed,
- a surface of said display connecting said third and fourth main surfaces is in contact with at least part of an inner side surface of said recess,
- wherein said panel comprises a sapphire panel.

9. An electronic apparatus comprising:
- a panel including a first main surface, a second main surface opposite to said first main surface, and side surfaces that connect said first main surface and said second main surface;
- a display located on said second main surface side of said panel;
- a housing configured to house said display; and
- a panel fixing member fixed to a peripheral edge of said second main surface of said panel and configured to fix said panel to said housing,
- wherein at least one of said side surfaces of said panel includes a first portion that does not face said panel fixing member, the non-facing first portion continuously extending from a center portion of the first main surface to a center portion of the second main surface of said panel.

10. The electronic apparatus according to claim 9, wherein
- said display includes a third main surface facing said panel and a fourth main surface opposite to said third main surface,
- said housing has a recess in which said display is housed, and
- a surface of said display connecting said third and fourth main surfaces is in contact with at least part of an inner side surface of said recess.

11. The electronic apparatus according to claim 10, wherein all of said side surfaces are said first portion.

12. The electronic apparatus according to claim 10, further comprising a battery housed in said housing,
- wherein a side surface closest to said battery of said side surfaces includes said first portion.

13. The electronic apparatus according to claim 10, further comprising an imaging unit located in said housing,
- wherein a side surface closest to said imaging unit of said side surfaces includes said first portion.

14. The electronic apparatus according to claim 13, further comprising a holding structure located between said housing and configured to hold said imaging unit by a grip force alone.

15. An electronic apparatus comprising:
- a panel including a first main surface, a second main surface opposite to said first main surface, and side surfaces that connect said first main surface and said second main surface;
- a display located on said second main surface side of said panel;
- a housing configured to house said display; and
- a panel fixing member fixed to a peripheral edge of said second main surface of said panel and configured to fix said panel to said housing,
- wherein at least one of said side surfaces of said panel includes a first portion that does not face said panel fixing member,
- said display includes a third main surface facing said panel and a fourth main surface opposite to said third main surface,
- said housing has a recess in which said display is housed,
- a surface of said display connecting said third and fourth main surfaces is in contact with at least part of an inner side surface of said recess,
- an imaging unit located in said housing,
- wherein a side surface closest to said imaging unit of said side surfaces includes said first portion,
- a holding structure located between said housing and configured to hold said imaging unit by a grip force alone,
- a piezoelectric vibrating element located on said panel,
- wherein a side surface closest to said piezoelectric vibrating element of said side surfaces includes said first portion.

16. An electronic apparatus comprising:
- a panel including a first main surface, a second main surface opposite to said first main surface, and side surfaces that connect said first main surface and said second main surface;
- a display located on said second main surface side of said panel;
- a housing configured to house said display; and a panel fixing member fixed to a peripheral edge of said second main surface of said panel and configured to fix said panel to said housing, wherein at least one of said side surfaces of said panel includes a first portion that does not face said panel fixing member, said display includes a third main surface facing said panel and a fourth main surface opposite to said third main surface, said housing has a recess in which said display is housed, a surface of said display connecting said third and fourth main surfaces is in contact with at least part of an inner side surface of said recess, wherein said panel comprises a sapphire panel.

* * * * *